United States Patent [19]

Ragle et al.

[11] Patent Number: 4,514,778
[45] Date of Patent: Apr. 30, 1985

[54] PARTITIONABLE PACK WITH END PLATES

[75] Inventors: Herbert U. Ragle, Thousand Oaks; Dean DeMoss, Camarillo, both of Calif.

[73] Assignee: Burroughs Corporation, Detroit, Mich.

[21] Appl. No.: 433,180

[22] Filed: Oct. 6, 1982

Related U.S. Application Data

[60] Continuation of Ser. No. 124,750, Feb. 26, 1980, abandoned, which is a division of Ser. No. 960,267, Nov. 6, 1978, abandoned, which is a continuation of Ser. No. 864,011, Dec. 23, 1977, abandoned, which is a continuation-in-part of Ser. No. 711,647, Aug. 4, 1976, Pat. No. 4,086,640.

[51] Int. Cl.³ .................. G11B 23/02; G11B 5/012
[52] U.S. Cl. ................................. 360/133; 360/98; 360/99
[58] Field of Search .................... 360/97–99, 360/133

[56] References Cited

U.S. PATENT DOCUMENTS

| | | | |
|---|---|---|---|
| 1,360,617 | 11/1920 | Brand | 209/110.5 |
| 3,936,880 | 2/1976 | McGinnis et al. | 360/98 X |
| 3,994,017 | 11/1976 | Barkhoff et al. | 360/98 |
| 4,011,591 | 3/1977 | Orlando et al. | 360/98 X |
| 4,019,204 | 4/1977 | Griffiths et al. | 360/102 X |
| 4,086,640 | 4/1978 | Ragle et al. | 360/133 |
| 4,086,641 | 4/1978 | Ragle et al. | 360/133 |
| 4,118,746 | 10/1978 | Gyi et al. | 360/99 |
| 4,129,891 | 12/1978 | Ragle et al. | 360/133 |
| 4,136,368 | 1/1979 | DeMoss et al. | 360/133 |

OTHER PUBLICATIONS

IBM/TDB, vol. 17, No. 6, Nov. '74, pp. 1710–1711, "Adjustable Flexible Disk Pack Assembly" by Herring et al.
IBM/TDB, vol. 18, No. 9, Feb. '76, pp. 2773–2774, "Multiple Access Flexible Disk Storage Apparatus" by Koestner.
IBM/TDB, vol. 19, No. 1, Jun. '76, p. 171, "Flexible Disk Structure" by Orlando.

Primary Examiner—John H. Wolff
Attorney, Agent, or Firm—John J. McCormack; Nathan Cass; Kevin R. Peterson

[57] ABSTRACT

Improved disk pack media for data storage is illustrated as comprising a pack of flexible magnetic recording disks which may be partitioned "end-wise".

The disk pack is flanked top and bottom by respective "dummy packs" and end-plates, the end-plates being formed simply from a stack of contiguous flexible disks.

15 Claims, 32 Drawing Figures

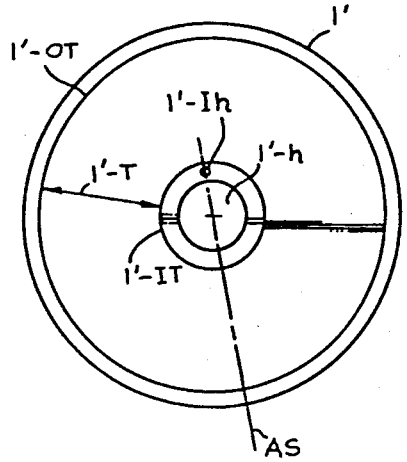
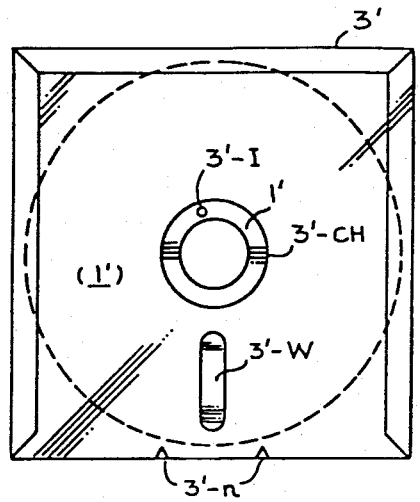
PRIOR ART
Fig. 1
Fig. 2
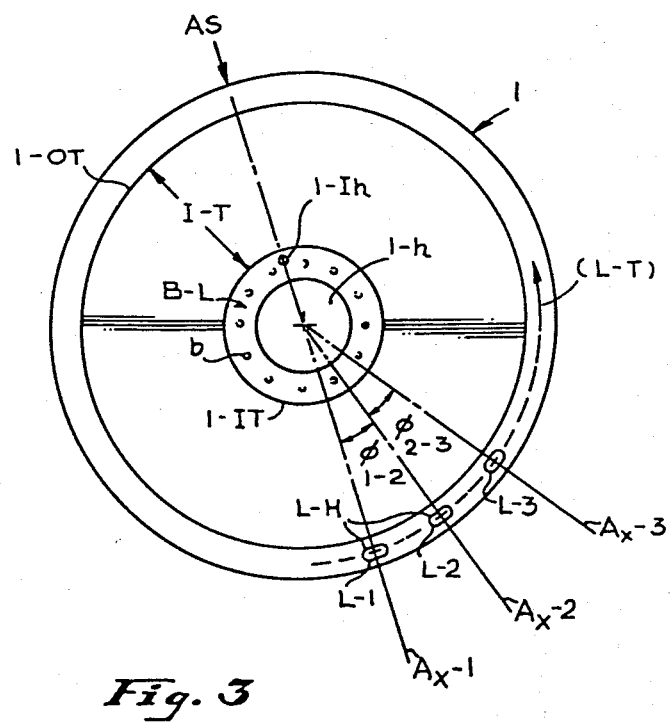
Fig. 3

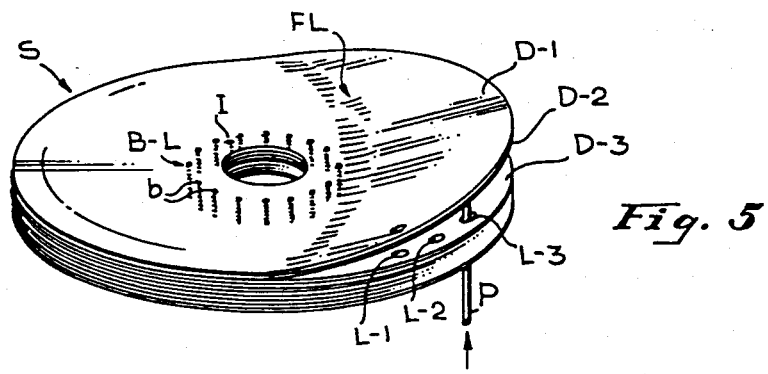
Fig. 5
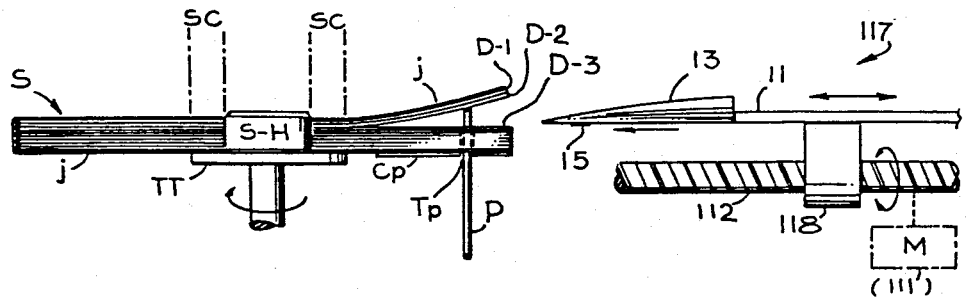
Fig. 6
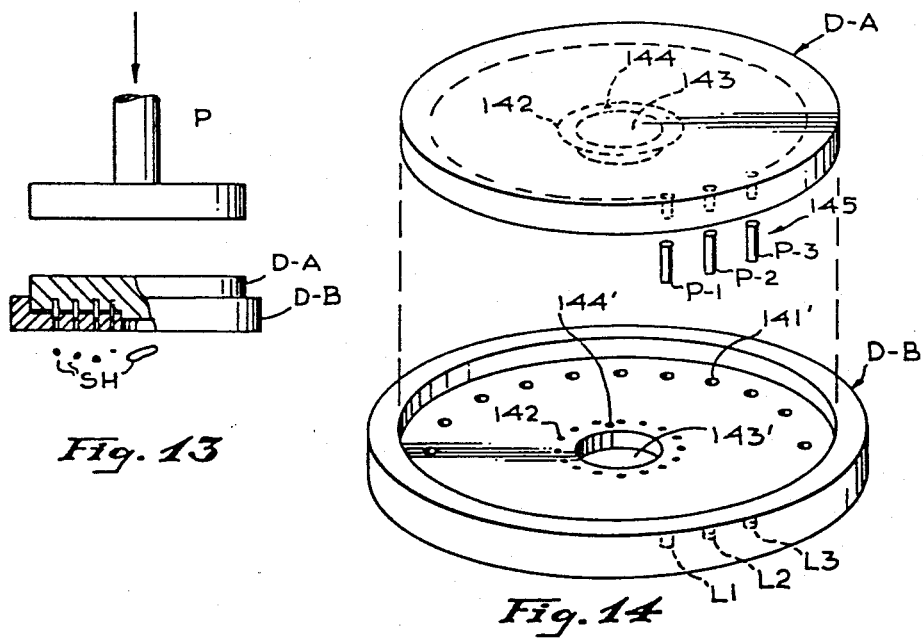
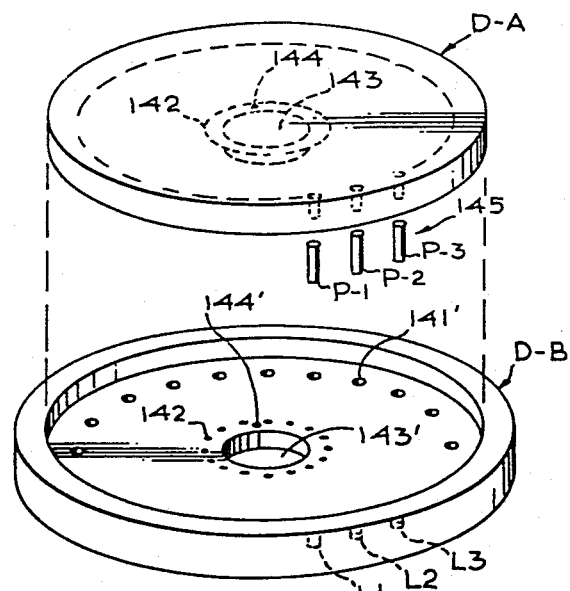
Fig. 13
Fig. 14

| TABLE I | HOLE REGISTRATION | (REF FIG 15) | | | | | |
|---|---|---|---|---|---|---|---|
| PARTITION-SITE (ALONG PARTITION RADII) | VIII | IX | X | I | II | III | --- | VII |
| DISK # 10' | $h_8$ | $h_9$ | $h_{10}$ | $h_1$ | $h_2$ | $h_3$ | --- | $h_7$ |
| 9' | $h_9$ | $h_{10}$ | X $h_1$) | $h_2$ | $h_3$ | $h_4$ | --- | $h_8$ |
| 8' | $h_{10}$ | X $h_1$) | | $h_3$ | $h_4$ | $h_5$ | --- | $h_9$ |
| 7' | X $h_1$) | | | $h_4$ | $h_5$ | $h_6$ | --- | $h_{10}$ |

O: INDICATES DEPTH OF PARTITION-BORES, BLOCKED
△: INDICATES INTER-SITE "DEADSPOTS" WHERE HOLES ARE SHIFTED OUT OF SITE-REGISTRY TO CREATE A BORE TERMINATION

Fig. 18

| TABLE II (REF FIG 15) | | | | | | | | | | |
|---|---|---|---|---|---|---|---|---|---|---|
| SELECT SITES | I | II | III | IV | V | VI | VII | VIII | IX | X (PARTITION PLANES) |
| DISK # 10' | 1 | 2 | 3 | 4 | 5 | 6 | 7 | 8 | 9 | 10 |
| 9' | 2 | 3 | 4 | 5 | 6 | 7 | 8 | 9 | 10 | /(1 |
| 8' | 3 | 4 | 5 | 6 | 7 | 8 | 9 | 10 | /(1 | /(2 |
| 7' | 4 | 5 | 6 | 7 | 8 | 9 | 10 | /(1 | /(2 | /(3 |
| 6' | 5 | 6 | 7 | 8 | 9 | 10 | /(1 | /(2 | /(3 | /(4 |
| 5' | 6 | 7 | 8 | 9 | 10 | /(1 | /(2 | /(3 | /(4 | /(5 |
| 4' | 7 | 8 | 9 | 10 | /(1 | /(2 | /(3 | /(4 | /(5 | /(6 |
| 3' | 8 | 9 | 10 | /(1 | /(2 | /(3 | /(4 | /(5 | /(6 | /(7 |
| 2' | 9 | 10 | /(1 | /(2 | /(3 | /(4 | /(5 | /(6 | /(7 | /(8 |
| 1' | 10 | /(1 | /(2 | /(3 | /(4 | /(5 | /(6 | /(7 | /(8 | /(9 |

SELECT HOLE #

Fig. 19

| DISK # | TABLE III (REF FIG 22) | | | | | | | | | | |
|---|---|---|---|---|---|---|---|---|---|---|---|
| | $X_1$ | $X_2$ | $X_3$ | $X_4$ | $X_5$ | $X_6$ | $X_7$ | $X_8$ | $X_9$ | $X_{10}$ | $X_{11}$ "DOWN-BORES" |
| DD-1 | $h_1$ | $h_2$ | $h_3$ | $h_4$ | $h_5$ | $h_6$ | $h_7$ | $h_8$ | $h_9$ | $h_{10}$ | $h_{11}$ |
| DD-2 | $h_{11}$ | $h_1$ | $h_2$ | $h_3$ | $h_4$ | $h_5$ | $h_6$ | $h_7$ | $h_8$ | $h_9$ | $h_{10}$ |
| DD-3 | $h_{10}$ | $h_{11}$ | $h_1$ | $h_2$ | $h_3$ | $h_4$ | $h_5$ | $h_6$ | $h_7$ | $h_8$ | $h_9$ |
| DD-4 | $h_9$ | $h_{10}$ | $h_{11}$ | $h_1$ | $h_2$ | $h_3$ | $h_4$ | $h_5$ | $h_6$ | $h_7$ | $h_8$ |
| DD-5 | $h_8$ | $h_9$ | $h_{10}$ | $h_{11}$ | $h_1$ | $h_2$ | $h_3$ | $h_4$ | $h_5$ | $h_6$ | $h_7$ |
| DD-6 | $h_7$ | $h_8$ | $h_9$ | $h_{10}$ | $h_{11}$ | $h_1$ | $h_2$ | $h_3$ | $h_4$ | $h_5$ | $h_6$ |
| DD-7 | $h_6$ | $h_7$ | $h_8$ | $h_9$ | $h_{10}$ | $h_{11}$ | $h_1$ | $h_2$ | $h_3$ | $h_4$ | $h_5$ |
| DD-8 | $h_5$ | $h_6$ | $h_7$ | $h_8$ | $h_9$ | $h_{10}$ | $h_{11}$ | $h_1$ | $h_2$ | $h_3$ | $h_4$ |
| DD-9 | $h_4$ | $h_5$ | $h_6$ | $h_7$ | $h_8$ | $h_9$ | $h_{10}$ | $h_{11}$ | $h_1$ | $h_2$ | $h_3$ |
| DD-10 | $h_3$ | $h_4$ | $h_5$ | $h_6$ | $h_7$ | $h_8$ | $h_9$ | $h_{10}$ | $h_{11}$ | $h_1$ | $h_2$ |

"UP-BORES"

Fig. 23

PARTITIONABLE PACK WITH END PLATES

CROSS REFERENCE TO RELATED APPLICATIONS

This application is a continuation of Ser. No. 124,750 filed Feb. 26, 1980 and now abandoned. Ser. No. 124,750 was a division of Ser. No. 960,267 filed in the U.S. Patent and Trademark Office on Nov. 6, 1978, now abandoned in favor of Ser. No. 155,366, filed June 2, 1980. Ser. No. 960,267 was filed as a continuation of Ser. No. 864,011, filed Dec. 23, 1977, now abandoned, Ser. No. 864,011 was in turn a continuation-in-part of Ser. No. 711,647, filed Aug. 4, 1976, now U.S. Pat. No. 4,086,640; all cases were filed on behalf of the same inventors, commonly assigned, and herewith incorporated by reference.

This and the following commonly assigned recently filed patent applications are related to the subject matter of this application and are herewith incorporated by reference.

Ser. No. 711;579, filed Aug. 4, 1976, now U.S. Pat. No. 4,134,144.

Ser. No. 711,628, filed Aug. 4, 1976, now U.S. Pat. No. 4,134,143.

Ser. No. 720,905, filed Sept. 7, 1976, now U.S. Pat. No. 4,135,368.

Ser. No. 766,288, filed Feb. 7, 1977, now U.S. Pat. No. 4,086,641.

BACKGROUND AND FEATURES OF THE INVENTION

This invention relates to data recording and in particular to novel improved multi-disk arrangements of data records adapted for automatic partitioning.

Workers in the art of generating and using recording media are aware of the various forms it takes; in the case of digital recording these forms have historically comprised drums, disks and tape in various configurations. Each medium has its own advantages and shortcomings depending upon the application. As mentioned in U.S. Pat. No. 4,086,640, magnetic disks have well known advantages, and in the form of "flexible disks" can serve as a "unit record" medium that is compact, light, and is readily transported, stored and handled, interchangably with other like disks. Flexible (or "floppy) disks are now widely used in the data processing arts.

Workers recognize that costs may be reduced in many cases by replacing a rigid magnetic recording disk with a "floppy" disk. Floppy disks can be fashioned from well-known polyester sheet material (e.g., the familiar polyethylene terephthalate used for magnetic tape) with a magnetic coating thereon—this plastic being simply cut into the shape of a circular disk with a central mounting hole to accommodate the familiar drive-spindle. Such a "prior art" floppy disk is well known to workers and is shown in FIG. 1; a conventional envelope, or jacket, therefor is illustrated in FIG. 2.

The present invention is directed toward improving the design of such flexible magnetic disks as adapted for collection in a "floppy pack" such that automatic partition means may be employed to split the pack and expose any selected disk surface. That is, an improved "floppy disk pack" according to the invention is particularly adapted for such automatic partitioning—using surprisingly simple means and methods as described hereinafter.

Prior efforts with flexible disks:

Workers are familiar with prior approaches to the design and manufacture of floppy disks and to related equipment for handling them. Several are described in U.S. Pat. No. 4,086,640.

Workers are aware that for many applications of floppy disk pack applications, it is of paramount importance to minimize disk cost while yet maintaining accurate, reliable operation. Thus, it is often desirable to fabricate all floppy disks in a pack by a single common pressing operation, with all disks identical—yet still render the disks uniquely "selectable" when collected into a pack. The invention teaches this, and other techniques, using utterly simple expedients. For example, with the invention an identical set of disks may be stacked with each disk in turn merely rotated by a prescribed angle relative to its predecessor and thereby produce a floppy pack affording the "plunger-partition" characteristics described in U.S. Pat. No. 4,086,640. Using a prescribed pattern of index holes such a pack will exhibit the desired "reference axes" from which "select angles" may be determined.

According to a further feature, such a "common perforation" mode of disk construction and pack arrangement may also be adapted for "dual-side recording" with the (common) partition and indexing hole pattern arranged to allow "flip-side" operation. Workers who appreciate the remarkable character of "floppy packs" in general will best appreciate these features and their surprising effectiveness despite the surprising simplicity of the techniques and the unexpected versatility of such "common perforation" disks. For instance, it was quite unexpected that with the disk design so-simplified it could nonetheless afford a wide latitude in selecting the number and position of "partition sites".

The present invention is directed toward providing improved multi-disk record units (disk packs) which are better adapted to meet the foregoing problems annd objectives in a manner satisfying minimum-cost objectives. The invention maintains the convenience of packaging a number of floppy disks in an "end-wise" partitionable file, while prescribing improved simplified techniques for fabricating the disks and pack. This file may take the form of a few floppy disks bound together in a portable pack (e.g., and mechanically partitioned) or many floppies permanently affixed upon a hollow spindle (e.g., and pneumatically partitioned from within the stack's axial region).

The foregoing and other features, objects and advantages according to the present invention will be more fully appreciated and become more apparent upon consideration of the following description of preferred embodiments, taken in conjunction with the attached drawings, wherein like reference indicia denote like elements.

BRIEF DESCRIPTION OF THE DRAWINGS

FIGS. 1 and 2 are schematic plan views of a prior art flexible disk and an associated prior art jacket, respectively;

FIG. 3 is a diagrammatic plan view of a flexible disk modified with a hole-encoding pattern according to the invention, while

FIG. 5 is a schematic side perspective of the disk pack embodiment of FIG. 4 interacting with associated pack-partitioning means; while FIG. 6 indicates a side view of such an arrangement in operative relation combination with a turntable and an associated transducer carriage assembly.

FIG. 7 is a plan view of an improved protective jacket, especially adapted for disk packs like those in FIGS. 4 and 5, while

FIG. 9 is a front perspective view of a "disk drive" adapted for handling disk pack media like the embodiment of FIGS. 4 and 5, as housed in a protective jacket like that in FIGS. 7 and 8, while

FIG. 11 is a schematic side view of a pack partitioning arrangement adapted for use with disk packs like those in FIGS. 4 and 5 and particularly adapted for inclusion in a flexible disk drive like that of FIGS. 9 and 10; while FIG. 14 is a schematic perspective view of a pair of mating disk-forming dies adapted to form hole-encoded disks of the type indicated in FIG. 3, these dies being shown in schematic operative relation in the side view of FIG. 13;

FIG. 15 is an exploded side perspective of a modified "single-hole-pattern" pack embodiment, similar to FIG. 4; while

FIG. 24 is a rather schematic elevation showing a simplified disk pack embodiment which is also "endwise partitioned", but pneumatically, and from within its hub region, with pack rotation means and a transducer assembly indicated in schematic cooperative relation; while

Conventional disk:

It is instructive to first consider the design and construction of a relatively conventional floppy disk design $1'$ as indicated in FIG. 1. Thus, prior art disk $1'$ may be understood as comprising a circular flexible substrate having a magnetic coating thereon. Such disks $1'$ are adapted for protective containment and operation within an envelope, or jacket $3'$.

Thus, disk $1'$ has a central aperture $1'$-h for engaging a conventional rotary-drive spindle (while contained within jacket $3'$), there being a prescribed recording track zone $1'$-IT, $1'$-OT; also, an "index hole" $1'$-Ih is disposed (within $1'$-IT) along a prescribed "reference radius" AS and adapted to establish a "Start Radius" for the circumferential data tracks as known in the art. Within inner non-recording margin $1'$-IT is an inner "contact annulus" defining the locus of engagement with spindle-contact means as known in the art.

DETAILED DESCRIPTION OF PREFERRED EMBODIMENTS

Figure 3A:
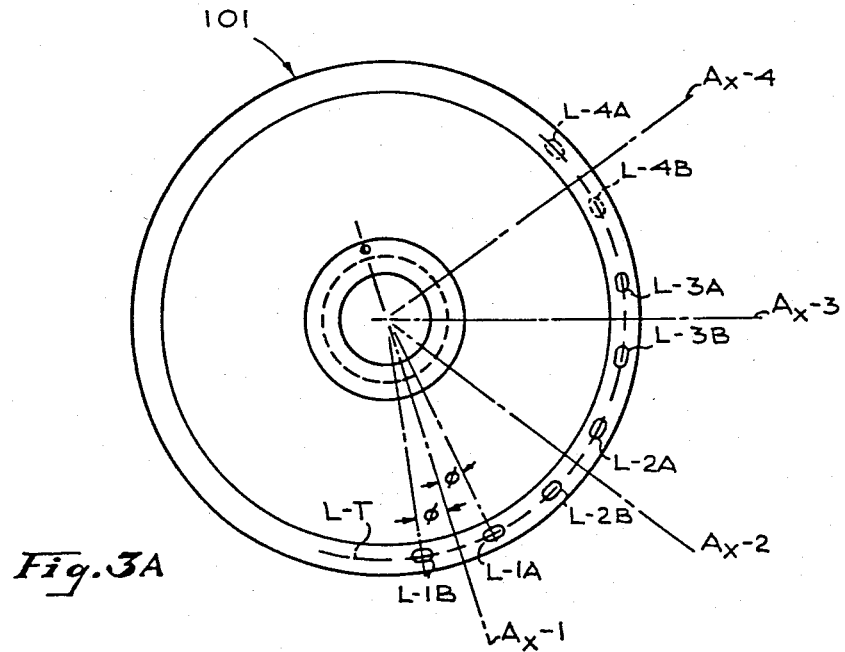
FIGS. 3A, 3B, 3C and 3D are like views of alternate arrays of holes (apertures)
Figure 3B:
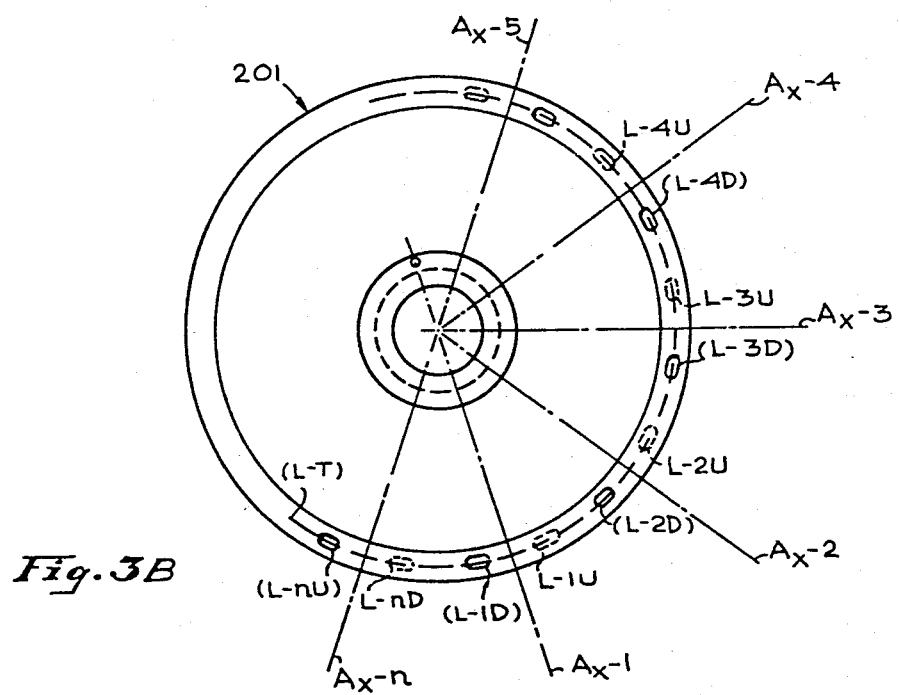
Figure 3C:
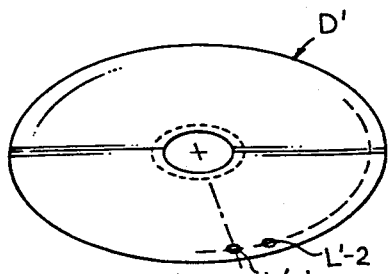
Figure 3D:
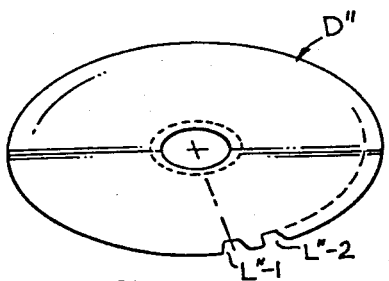
Figure 4:
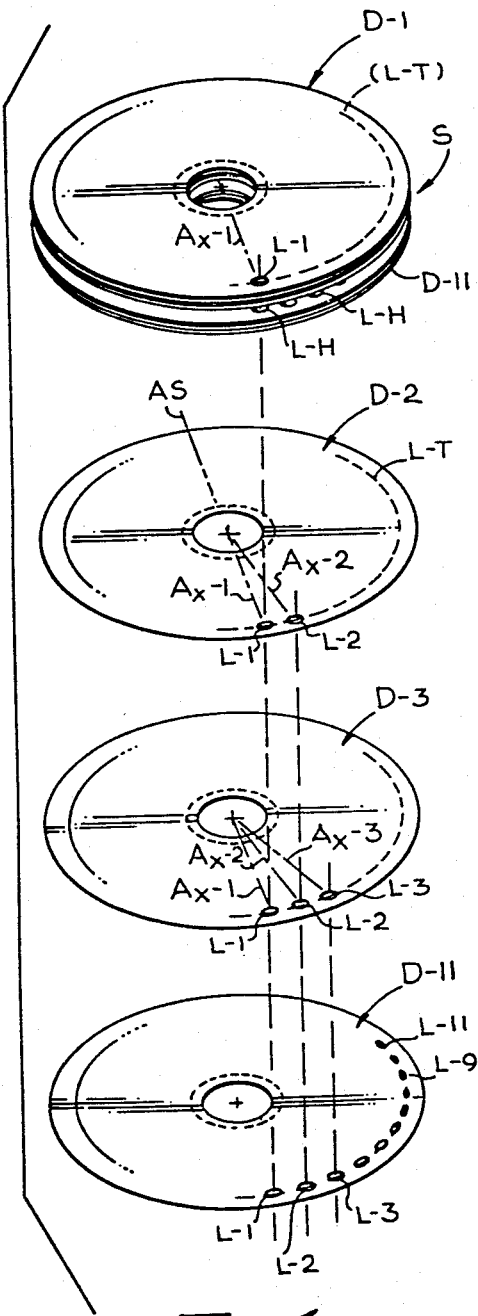
FIG. 4 is a schematic diagram of a flexible disk pack embodiment according to the invention, with exemplary disks therein shown exploded-away for illustrative purposes.

FIGS. 3, 4 and 5 indicate one technique for fabricating disk packs according to a "variable" hole-pattern mode whereby a different pattern of partition-holes is cut in each disk of a pack. Thus, with the disks all stacked in registry (e.g., all registered on a single, commonly-located index hole) the resulting pack will exhibit the required array of "partition-bores", one for each disk selection and exposure operation—each bore (aligned holes) being disposed at a different respective angular position about the pack. Then, a given partition may be achieved by simply rotating the pack to register the corresponding "partition-bore" needed to give access to the "selected" disk by the partition means (e.g., plunger P). This and other related "variable" hole-pattern schemes are more fully described elsewhere and in the cited U.S. Pat. No. 4,086,640.

Figure 15:
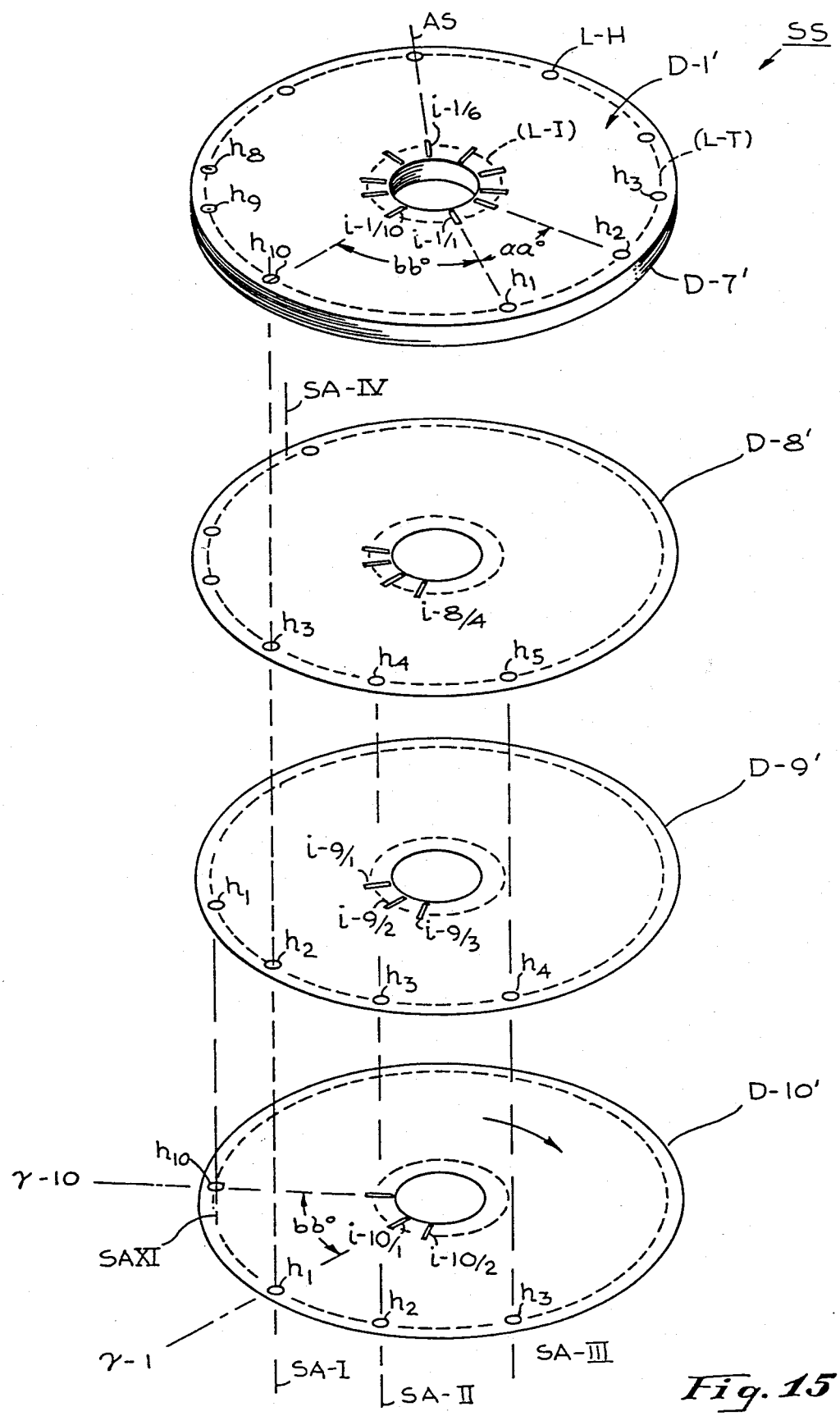
Figure 16:
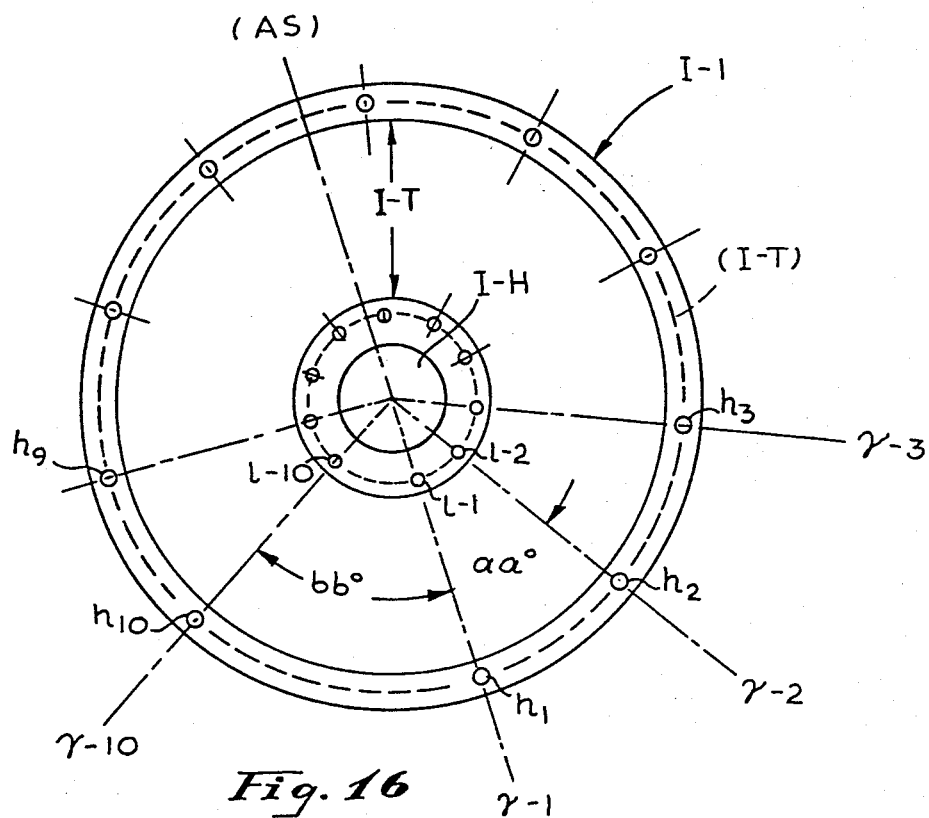
FIGS. 16 and 17 are plan view diagrams indicating a mode of stacking disks for embodiments like FIG. 15, and FIGS. 18 and 19 tabulate resulting partition bore patterns.
Figure 17:
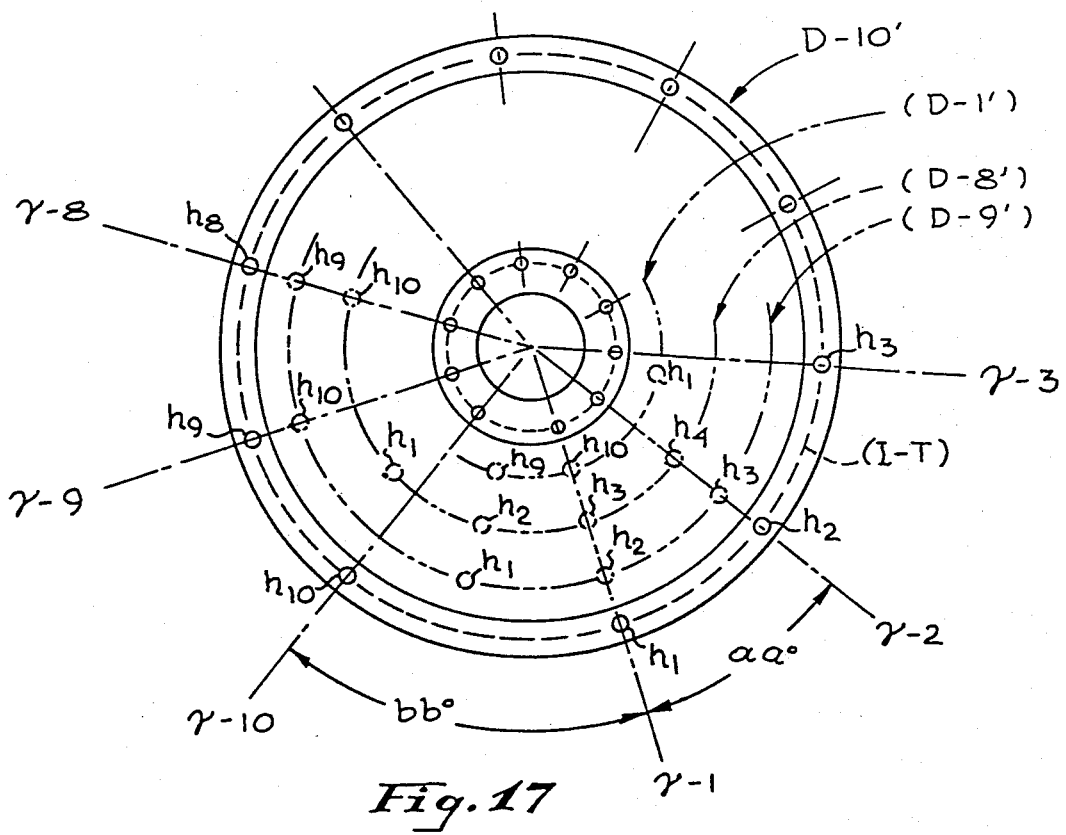

But, as workers will attest, it will often be preferable to use a single identical disk configuration and the mentioned "common-perforation" pattern, e.g., to avoid the need for cutting a different hole pattern in each disk. FIGS. 15-17 schematically indicate an embodiment of such a "common-perforation" pattern according to a prime feature of invention. According to this feature, a single identical pattern of partition holes is cut in all disks, together with an associated "multi-index hole" pattern. When the disks are stacked, each disk is rotated into partial misregistration with all other disks to thereby dispose its associated partition-holes at a unique characteristic rotational position in the pack. The effect is to render an array of "partition-bores" which is functionally the same as those alluded to above in the "variable" hole-pattern technique (and detailed in U.S. Pat. No. 4,086,640)—the holes being differently positioned, rather than differently cut, in each disk.

Disk I-1 in FIG. 16 illustrates this "common-perforation" pattern with ten (10) partition holes ($h_1$ through $h_{10}$) disposed equidistant (angle aa°) about disk I-1 along a circumferential track, except for an unequal separation between "terminal holes"—i.e., the separation between first hole $h_1$ and the last hole $h_{10}$; or "terminal separation" bb°, is, here, greater than that (common) distance between all other partition holes [and workers will perceive that "terminal separation" bb° may conversely be less than aa° in other applications]. Thus, the separation angle bb° between (the radii of) "last hole"

$h_{10}$ and "first hole" $h_1$ is greater than the angle aa° between all other holes (bb°>aa°).

Disk I-1 is otherwise identical to the aforementioned disks (e.g., in FIG. 3) except as mentioned; for instance, including the same kind of inner and outer track-bands with intermediate recording band (I-T), hub-bore I-H and annular bond sites (b), etc. However, disk I-1, and all of its stacked companion disks, will also exhibit a common "multiple index pattern", with an index hole i along each partition-hole axis so that despite the stacking of disks into this "partial misregistration", one index bore will nonetheless ultimately remain "open" through the pack (e.g., the bore along "reference plane" AS in FIG. 15 resulting from registering index slit $i$-$10/_1$ of disk D-10′ with slit $i$-$9/_2$ of superposed disk D-9; then $i$-$8/_3$, etc.—through $i$-$1/_{10}$ of D-1′, the top disk in the pack).

FIG. 15 illustrates (schematically) a ten-disk stack SS of identical disks (D-1′ through D-10′), all exhibiting a common identical pattern of "partition holes" ($h_1$–$h_{10}$) and associated index slits (i). Each partition hole h may be understood as disposed along a respective disk radius (e.g., radius r-1 for hole $h_1$ or radius r-10 for $h_{10}$—see FIG. 15) at its intersection with partition track L-T. Similarly, one index slit i is aligned along each such radius at a common "index track" L-I disposed inside the recording band I-T (e.g., slits $i$-$10/_1$ through $i$-$10/_{10}$ along radii r-1 through r-10 of disk D-10′ and slits $i$-$1/_1$ through $i$-$1/_{10}$ on disk D-1′). Further, in FIG. 15 the radii r-1 through r-10 of bottom disk D-10′ may be understood as extended in space normal to D-10′ to form ten "partition planes", SA-I through SA-X, respectively.

Thus, workers will appreciate that these disks are, as a group and according to the invention, encoded and arranged to be manipulated as a group for the selectable partitioning, or splitting, of the stack adjacent any selected disk surface. This is basically accomplished in accordance with the invention by providing the stacked disks with an encoded arrangement of apertures such that at least one set of unique various-length partition paths or partition bores are provided from a respective end of the stack, each bore terminating at the surface of a different disk. Partition forces applied along a selected one of these bores will then cause the stack to be flexed open between a corresponding pair of adjacent disks in the stack, exposing the "selected" disk surface. In the preferred embodiments considered herein, this is controlled according to the rotational (angular) position assumed by the pack relative to an associated partition means as described hereinafter.

Locator-hole array ("common-perforation" disk design):

According to one feature of novelty, a file of these novel "commonly-perforated" flexible disks D-1′, etc. (FIG. 15) are manufactured to be identical and adapted to include a common prescribed array of partition apertures or locator holes, L-H, as schematically indicated, for example, by locator holes $h_1$, $h_2$, $h_3$, etc. This aperture array will be seen as establishing a certain mode whereby the stacked disks may be partitioned according to a unique, simple control involving merely rotating the stack to different (rotational) angular positions, each position corresponding to exposure of a respective (face of) one of the disks. Each disk in a file, or stack SS, will be understood as having a unique identifiable number of such locator holes L-H so that when the disks are stacked superposed in congruence with their circumferential edges in registry, they will be seen to represent a hole-encoded array. That is, when viewed from one side, the stack will present an array of partition-bores (holes L-H in registry), each bore at different angular location about the disk periphery and each bore terminating at a different respective disk. Thus, each partition-bore corresponds to a prescribed select-plunger site adapted to facilitate the splitting, (i.e., partial-partitioning), of the stack to expose the recording surface of a corresponding selected disk.

"Rotary-shift" disk stacking:

Now, an illustrative technique for stacking such identical disks into a partitionable pack will be described with reference to the exemplary embodiment in FIG. 15 (pack SS). Thus, with bottom disk D-10′ used as a reference (though any disk will serve) disks D-9′ through D-1′ will, in order, be superposed in registration on its predecessor and will then be rotated by a prescribed common angle (e.g., angle aa°, clockwise)—thereby creating a pack with ten partition bores, each bore at a different partition site distributed about the pack somewhat regularly—each site being associated with the selection of a different respective disk in the pack. For example, D-9′ is superposed in registry on D-10′ and is then rotated by angle aa°, clockwise (aa° is the "normal" inter-hole separation here). This will register the partition holes $h_2$ through $h_{10}$ with holes $h_1$ through $h_9$, respectively of underlying disk D-10′, and will also "block" hole $h_1$ on D-9′ by positioning it at a "dead spot" sector between the "terminal radii" (r-1 and r-10) of D-10′. Next, disk D-8′ is superposed in registry with D-9′ and then likewise rotated (by aa° clockwise)—this serving to register the partition holes on D-10′, D-9′, D-8′, as indicated very schematically in FIG. 18 (Table I).

The foregoing will indicate how this technique for stacking "common perforation" disks can serve to "block off" successive "partition-bores" according to the described rotation for "partial misregistry"; i.e., whereby rotation of disk D-9′ blocks the bore along plane SA-X (at D-9′); rotation of D-8′ blocks SA-X plus SA-IX (at D-8′); rotation of D-7′ blocks SA-X, SA-IX plus SA-VIII (at D-7′) and so forth, culminating with D-1′ where, once so rotated, it blocks all planes except SA-I. FIG. 19 (Table II) indicates the full ten-disk stacking mode very schematically, denoting the successive bore-blocking disk rotation technique [here, with a slash ("/") line used to indicate blocking, with the adjacent partition hole of the blocking disk indicated by an adjacent numeral in parenthesis].

Similarly, FIG. 17 schematically indicates how D-9′ is stacked on D-10′ in such "partial misregistry", leaving each of its partition-holes registered with a respective adjacent-number hole of D-10′, except for hole $h_1$ which, falling between axes r-1/r-2, is "blocked" to, thereby terminate the respective bore (note: only holes $h_1$, $h_2$, $h_3$, $h_9$, $h_{10}$ of D-9′ shown—and these are shown displaced radially-in from partition track I-T for clarity of explanation, it will be understood that in actual practice all partition holes h fall along track I-T). Likewise, when D-8′ is stacked on D-9′ in such "partial misregistry" all of its holes h will register with adjacent-numbered holes h of D-9′ except $h_1$ and $h_2$, as also indicated in FIG. 17. Top disk D-1′ will thus have all holes h misregistered except hole $h_{10}$ which will register with $h_1$ of D-10′.

The index slits (i) are similarly arranged and manipulated. That is (see FIG. 15), the superposition of D-9′ onto D-10' registers slits i-9/$_1$, i-9/$_2$ etc. on D-9', with slits i-10/$_1$, i-10/$_2$ etc., respectively on D-10'; also the indicated angular shift moves them so that the 10/$_{10}$ bore in D-10 is "blocked", and all other D-10' slits are "open" (slits 10/$_1$, 10/$_2$ registering with slits 9/$_2$, 9/$_3$ respectively of D-9' and so on). Superposition of D-8' and a like rotation will then "block" slit bores 10/$_{10}$ and 10/$_9$ (on D-10'), leaving the other slit-bores "open" in the following registration pattern in Table IV, below:

TABLE IV

| Disk No.: | Slit Sites: | | | | | | | | | |
|---|---|---|---|---|---|---|---|---|---|---|
| | * | * | * | * | * | * | * | * | * | * |
| 10': | 10/$_1$ | 10/$_2$ | 10/$_3$ | 10/$_4$ | 10/$_5$ | 10/$_6$ | 10/$_7$ | 10/$_8$ | 10/$_9$ | 10/$_{10}$ |
| 9': | 9/$_2$ | 9/$_3$ | 9/$_4$ | 9/$_5$ | 9/$_6$ | 9/$_7$ | 9/$_8$ | 9/$_9$ | 9/$_{10}$ | X$_{(1)}$ |
| 8': | 8/$_3$ | 8/$_4$ | 8/$_5$ | 8/$_6$ | 8/$_7$ | 8/$_8$ | 8/$_9$ | 8/$_{10}$ | X$_{(1)}$ | X$_{(2)}$ |

Superposition and like rotation of disk D-7' will also block slit 10/$_8$ (of disk D-10', along with slits 10/$_{10}$, 10/$_9$ thereof); likewise D-6' is then stacked to also block slit 10/$_7$; then D-5' blocks 10/$_6$, then D-4' blocks 10/$_5$; then D-3' blocks 10/$_4$; then D-2' blocks 10/$_3$ and lastly disk D-1' also blocks slit 10/$_2$—leaving only one "index channel" open from slit 10/$_1$ of D-10, through the pack SS, to register with slit 1/10 of D-1', as is desired.

Workers will appreciate that a "common-perforate pattern" disk design and a "rotary shift" stacking mode like the above described (FIGS. 15–19) results from distributing the partition holes so that all are equidistant (i.e., separated by angle aa°) except for the "terminal" (first and last) holes which are differently spaced, by bb° (here, bb°>aa°)—so that a constant "rotary shift" of each successive stacked disks will so partly-misregister the disk partition holes as to cumulatively "block" the partition bores, each at the level of a different disk. Workers will also perceive that according to this scheme, this "terminal" separation (bb°) of partition-holes may alternatively be less than the "regular separation" (aa°) thereof (i.e., bb<aa). An example of this is indicated very schematically in FIG. 20 described as follows.

Figure 20:
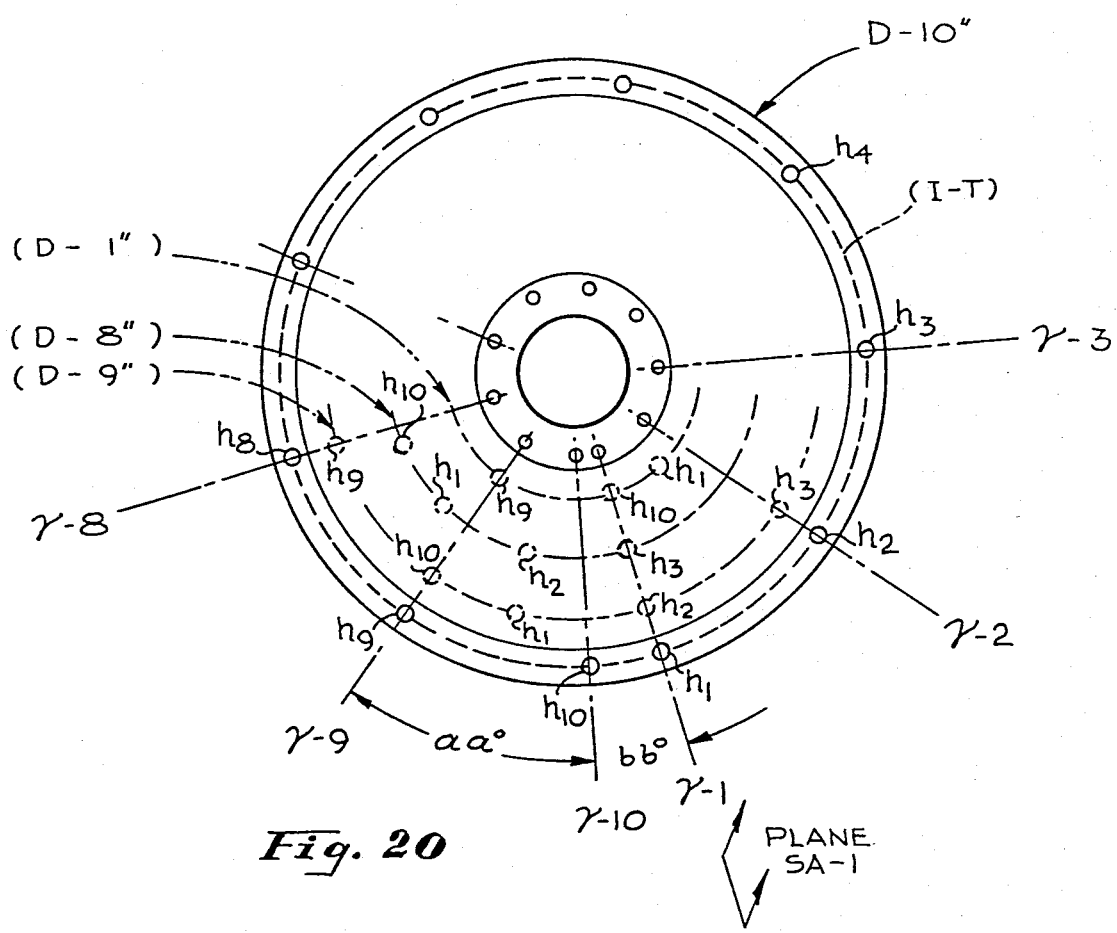
FIG. 20 is a plan view like FIGS. 16 and 17 but indicating disk stacking for a modified "single-hole-pattern"

Modified embodiment (FIG. 20):

In FIG. 20 the same kind of stacking technique is illustrated as in FIG. 17, except that the "terminal" partition holes (e.g., holes h$_{10}$, h$_1$ of D-10'') are separated by a "terminal separation" (bb°) which smaller (rather than larger) than the "normal separation" (aa°) of the other partition holes (i.e., bb<aa) though stacking is the same, as are the results. Thus, disk D-9'' is indicated very schematically as superposed on D-10'' in registry, then rotated clockwise by aa°, throwing its h$_1$ hole beyond hole h$_{10}$ of D-10'', but leaving each of its other partition holes h registered with a respective adjacent-number hole of D-10''. [As in FIG. 17, holes h on disks D-9'', D-8'' and D-1'' are illustrated as displaced radially inward from track I-T— but this is only for purposes of clear explanation; they will be understood as all falling along partition track I-T in actual practice]. Next, superposition and like rotation (aa° CW) of D-8'' leaves all of its holes h registered except h$_1$ (as with D-9'') plus h$_2$. Each successive disk stacked then adds one further blocked hole, in order, until finally with D-1'' all holes are blocked except for hole h$_{10}$ (which is registered with h$_1$ of D-10 along plane SA-I).

Workers will perceive how disks may, according to the foregoing "common perforation" pattern of partition holes with an "anomalous" separation of terminal holes, and according to the associated technique of stacking in partial misregistration, serve to block successive "partition-bores" of the stack, in order. It will be apparent that this provides a pack exhibiting a different partition bore for partition at each disk at a different angular location and adapted to expose a prescribed surface of the respective disk.

Workers will further perceive how this technique may be implemented in other various ways. For instance, the illustrated packs (e.g., FIG. 15) are shown as preferably symmetrical as to hole location and may be "flipped" for partition from either side. Now, some workers may also desire a "double/opposed plunger" partition mode (e.g., as described in U.S. Pat. No. 4,086,640). In such a case, each partition site above-described should be replaced with a pair, each site-pair symmetrically flanking a common partition radius—with only one site in each pair being perforated, thus presenting a single partition hole aligned along each radius. Other modifications within the scope of this invention will occur to workers.

Workers will contemplate other similar implementations of this "common-select-hole pattern". For example, the "bottom" disk D-11 in FIG. 4 may be modified so that its "select-holes" L comprise eleven holes dispersed equidistant (at aa° intervals) about track L-T, except that the "last" hole L-11 is made to fall spaced from hole L-1 by somewhat more than aa° (but less than 2×aa°)—e.g. hole centers separated by about 32.7° except about 33° between L-11 and L-1. Now, disk D-10 may consist of a duplicate of D-11, but oriented (when pack S is formed) so its locator holes L are rotated (e.g., clockwise) by the "normal" inter-hole spacing, here, 32.7°. Similarly, D-9 may consist of a duplicate of D-10 likewise rotated 32.7°. Likewise for D-8 through D-1—all with identical partition hole patterns, but each rotated to take up a unique angular orientation in the pack. It will be recognized that this will operate to yield a successive blocking of bores; i.e., to "block" hole site L-1 on disk D-1; to block hole sites L-1 and L-2 on D-9—and so on, with disk D-1 finally having all hole sites blocked (plunger paths terminated) except L-11—thus facilitating the desired selective disk-deflection by entry of a plunger through a selected one of the "bores" (registered hole arrays) so formed.

Of course, steps must be taken to maintain a working index hole despite such angular shifts. For instance, and index hole may be provided along each select axis, whereupon only the "L-11" radius (axis A$_{X-11}$ aligned radially with L-11 hole only D-1) will present a "through-path" for index beam detection.

Other like modifications of the select hole pattern may be contemplated (e.g., rotating each disk more than aa° with L-11/L-1 sepration bb° somewhat less than aa°—such as aa=34°; bb=20°). Of course, selection of separation angle will be limited where only certain angular step increments of a rotating stepper-motor are feasible and where only certain plunger-transducer positioning and spacing is practical.

It is thus necessary to make this "terminal separation" (bb°) a different angle from the other separations (i.e., $bb° = \pi(aa°)$). Also, for convenience, etc it is preferred to keep $bb°$ less than $2 \times aa°$.

Multiple "partition-plungers"; "paired" locator holes:

Further, according to a modified feature of the invention, indicated functionally in FIG. 3A and described in U.S. Pat. No. 4,086,640, a plurality of such "partition-plunger means" (rather than a single plunger) may be used, together with associated plural sets of accommodating locator-holes. Workers should recognize that the described "hole-encoded" stack of flexible disks can be employed advantageously with such "multi-plunger" partition means. For instance, the plunger shown in FIGS. 6 and 11 may, instead, comprise an "opposed pair" adapted to urge disks in two opposed directions, rather than just one. One such plunger can deflect disks away from a "selected" disk surface, while the other plunger deflects disks away from the other disk side— (e.g., where two-sided transducer operation is contamplated). Such a plunger pair can also "hold" the "selected" disk in position stabilized for head-engagement (e.g., against a reference surface; or alternatively against the urging of a second opposed pair of plungers). This second opposed plunger advantageously strips the "selected" disk away from the deflected disks which may otherwise "carry" it along (e.g., held by static electricity or the like).

In any event, where a pair of such plungers is contemplated, they will typically be separated (by a distance p-d between excursion axes) and the "floopy stack" will accordingly be provided with two (not one) sets of partition-bores—one from either end of the stack! Preferably, and according to an improvement feature, each such hole lies at one of two perforation-sites flanking a common intermediate radius equidistantly.

Figure 22:
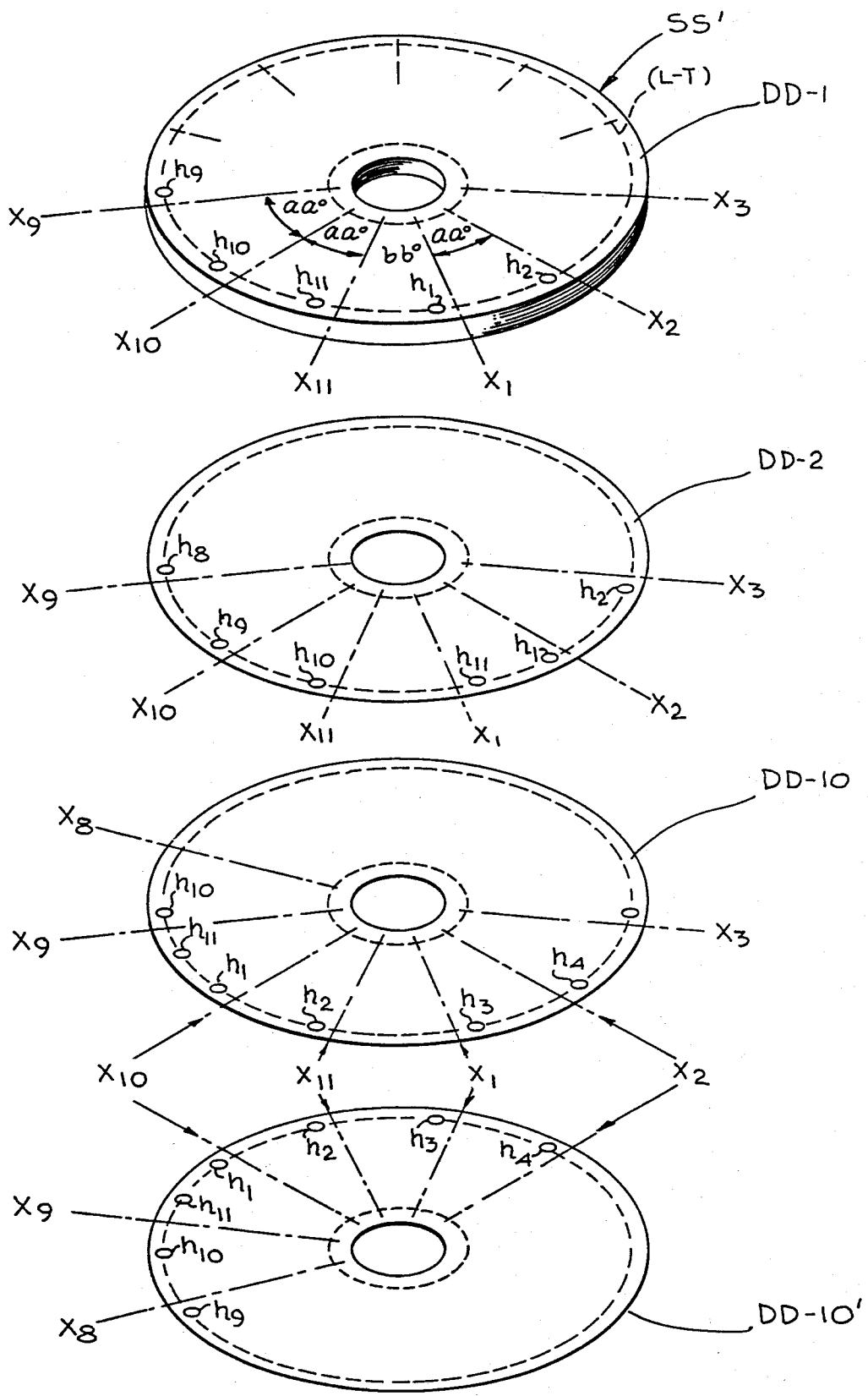
FIG. 22 is a perspective along the lines of FIG. 15 with the hole pattern and stacking mode modified and FIG. 23 tabulating resultant bores.

Such an arrangement is illustrated by stack SS' in FIG. 22, comprising ten (10) identical floppy disks stacked in prescribed "partial misregistration" and like the aforedescribed disk stacks except as otherwise specified "bottom" disk DD-10 is depicted in "top-view" as well as "from below" (i.e., "flipped" at DD-10') to illustrate a feature whereby the described "partial-misregistration" series the dual function of successively closing-off bores in the first set and opening-up bores in the second set. More particularly, consider stack SS' as viewed from above and as stacked (proceeding from disk DD-1 down to DD-10) by rotating successive disks by $aa°$ (CCW). It will be evident that each disk has an aperture spaced $aa°$ from its neighbor (from $h_1$ to $h_{11}$) except for the smaller spacing $bb°$ between $h_{11}$ and $h_1$. Also, each aperture is spaced by the same amount (common angle) from an associated radial-axis (e.g., $x_1$ near $h_1$, $x_2$ near $h_2$ etc.). Further, each aperture should be viewed as having a companion bore-site symmetrically flanking its respective axis (i.e., the same distance therefrom on the other side, along track L-T) such that one site is the "mirror image" of the other, coinciding with the other when the disk is "flipped" (e.g., as DD-10' represents DD-10 flipped "upside-down").

The foregoing will make it apparent how the invention may be employed with a "double-plunger" array. That is, as stack SS' evolves with disks stacked from DD-1 to DD-10—and each disk rotated by $aa°$ (CCW), "down bores", giving downward-access, will be gradually closed-off (e.g., all open on DD-1; one closed when DD-2 is sub-posed under DD-1; finally all but one blocked when DD-10 is sub-posed); whereas the counterpart "up bores" will be gradually opened-up as the stack builds (e.g., one created, adjacent $x_1$, when DD-2 is positioned below DD-1, till finally ten are created by the placement of DD-10). Of course, these "up-bores" flank the mentioned radial axes ($x_1$, etc.) symmetrically with the "down-bores"—and simply exchange places if the stack is "flipped-over"—an extremely useful feature as workers will attest! Workers will visualize a multitude of various ways this "double-plunger/double bore set" technique can be implemented.

Novel disk pack:

According to a principal feature of the invention, improved flexible disks like those described above are apt for collation and stacking together in combination and properly registered in a novel "flexible disk pack", as indicated, for instance, in FIGS. 4 through 6 of FIG. 15. It will be evident, of course, that the pattern of locator holes (whether single or double pattern) and/or the mode of shifting a single pattern will be coordinated in the usual case with a particular stack in mind, the stack being comprised of certain number of such disks, with each disk in the stack having its own unique variation in the (common) pattern of locator holes—as to number and/or registration (e.g., each with a unique number of holes and/or registry pattern). Thus, as more fully described below, one may manufacture these disks in sets for efficiency and convenience sake. For instance, one may punch-out a set of common disk patterns as in FIGS. 15-18 and assemble disk packs by collating a prescribed total number thereof into a pack, stacking each disk in the described "partial misregistry". As a feature of convenience the disk total may be left somewhat "open-ended" and variable, so that disks may be added at any time after a pack is first assembled.

Manufacturers will find it particularly convenient to manufacture flexible disks according to the invention by relatively convenient inexpensive means, such as in a cutting-out or stamping operation, as well known in the art (see also U.S. Pat. No. 4,086,640).

Preferably, and according to another feature, when such a disk pack is assembled, the disks are bonded to one another along a bonding annulus disposed along a common registering circumference, adjacent the disk center, and spaced radially therefrom to lie in the inner "non-recording" band. Thus, a circular array of "epoxy pillars" B-L is indicated as a discontinuous serial of bonding sites in FIGS. 3 and 5, to constitute the pack bonding means, whereby each pillar B (FIG. 5) is comprised of epoxy. Alternatively, a continuous inter-disk bond may be provided by means well known in the art. This bond will hold the disks together as assembled in the stack and keep them from lifting away from one another and from being rotated into misregistration with one another.

Workers will contemplate alternate bonding techniques. For instance, one might interpose an annular adhesive spacer between disks in a pack and provide it with adhesive surfaces adapted to adhere to the upper and lower disk thereby bonding them together. In another technique, where contemplated disk format and handling allow, one might insert pins through each set of bonding bores and cap their ends, thus preventing misalignment in the radial and circumferential sense (also, perphaps, allowing prescribed axial freedom to better accommodate pack partitioning).

Workers in the art will recognize that such a permanently bonded flexible disk pack is new in the art and is uniquely well adapted for many desirable functions, such as the hole-encoded disk selection operations (described elsewhere), as well as for containment and operation of the pack—as a whole—within a protective jacket (as described below). Thus, workers may now contemplate the use of a multi-disk flexible pack as a multi-surface unit record which is almost as lightweight, as compact and as easy to manipulate, store, transport, etc. as a single disk, while having many times its storage capacity.

By way of illustration, it has been found that a pack of 20 flexible disks according to the invention (e.g., as in FIG. 3 and Table I), each with a nominal 3 mil thickness, can be used in a "floppy disk pack" presenting a composite thickness of little more than 60 mils and, rather surprisingly, may be readily packaged and operated in a protective jacket similar to the prior art jacket indicated in FIG. 2. Further, such a pack may be manipulated and operated inside this jacket with disk drive equipment that requires relatively little modification over the conventional single-disk drives known in the art.

Figure 5A:
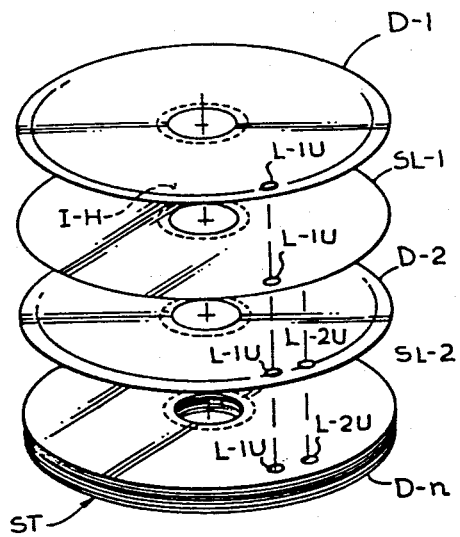
FIG. 5A shows a similar, schematic, view of a like disk pack embodiment, including separator disks as well, with several elements exploded-away for illustration purposes.

Liners:

FIG. 5A indicates a similar pack of flexible disks, D-1 through D-n, understood as bonded together in fixed, registering superposition to form a single unitary multi-disk pack ST. This pack is, however, somewhat modified, according to a further improvement feature, to include protective flexible spacers, or "liners"(SL) interleaved between adjacent disks in the pack. More particularly, FIG. 5A shows the upper two flexible disks, D-1 and D-2, exploded-away 0033 stack ST for illustrative purposes, and indicates the protective liner means in the form of flexible plastic disks, SL-1 and SL-2, interposed between D-1/D-2 and between D-2/D-3, respectively. Also outer liners (top and bottom of pack—(not shown here) may be added as well.

Liners SL may be comprised of the same (or a closely similar) flexible plastic material as the disk substrates, but of course, will preferably carry no magnetic coating. It has been found that confronting oxide-coated sheets in certain embodiments may be rubbed or scraped against one another such as to "scour" or gall magnetic oxide from one to the other. For instance, this may occur with a novel flexible disk pack during partitioning, etc., and can be damaging. Alternatively, the liners may comprise a grit-absorbing material. This will prevent grit particles from indenting, scratching or otherwise affecting flexible disks in a pack.

According to this feature, liners S may be provided to protect every oxide surface, preferably being bonded together along with the disks into a unitary pack. Liners SL include an index hole I-h in registry with that of the disks D, as well as a locator hole pattern identical with that of the adjacent disk and in registry therewith. As to the "up-holes" (e.g., L-1U illustrated in SL-1—i.e., adapted for the "up" select/partitioning arrangement represented by the disk embodiment in FIG. 3), it will be understood that a liner's locator hole pattern will be identical to that of an adjacent disk (here, disk D-2 for liner SL-2, D-1 for SL-1). For embodiments also including "down-holes" (as in the embodiment of FIG. 3B) the down-hole pattern of a liner will follow that of its interposed disk (so a liner will never intervene between a transducer and exposed disk). Thus, the spacers, or liners SL, may for instance, comprise a clear polyester, such as polyethlene terephthalate (e.g., a white "Melanex", trade name of ICI) about 1-2 mils thick, or a similar thin flexible material with low friction, "non-galling", anti-war surface (or surface coating). Liners will be especially useful where contemplated pack life/usage is to be extended and the associated pack enlargement can be tolerated. Also, such a liner may be interposed between the pack (top and bottom) and its envelope.

Alternate liner materials may of course be used as contemplated by workers in the art, the thickness and other characteristics thereof being modified to suit the requirements of a particular application. While not necessary in every application the use of such liners is preferred in cases where one or both magnetic recording surfaces of a flexible disk, so bonded into a flexible disk pack, exhibit wear and abrasion problems.

Of course, alternative to using liners SL, the stacked disks D may have one side thereof coated with a protective film, shielding it from such adverse contact with a facing magnetic recording surface (e.g., a coating of one to several mils of clear plastic such as "Black Watch" by 3M Co.) or the plastic substrate may be left uncoated by any magnetic oxide or by any similar coating. Of course, as workers in the art know, flexible disk manufacturers prefer to coat both disk sides with a magnetic oxide for their own manufacturing convenience, and to prevent curl.

Thus, it should be apparent to workers skilled in the art that according to this feature, with this or any similar stamping operation, stacks of hole-encoded disks of the type described may be very inexpensively and conveniently produced.

Figure 7:
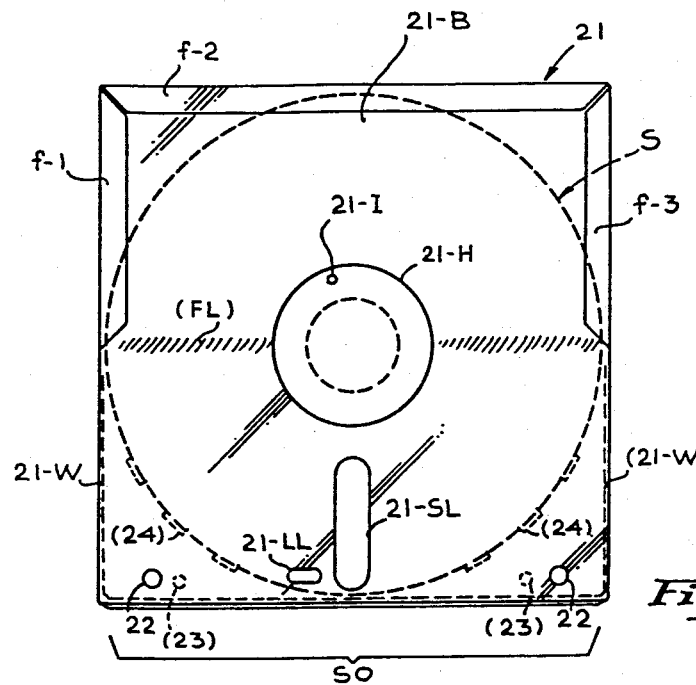
Figure 8:
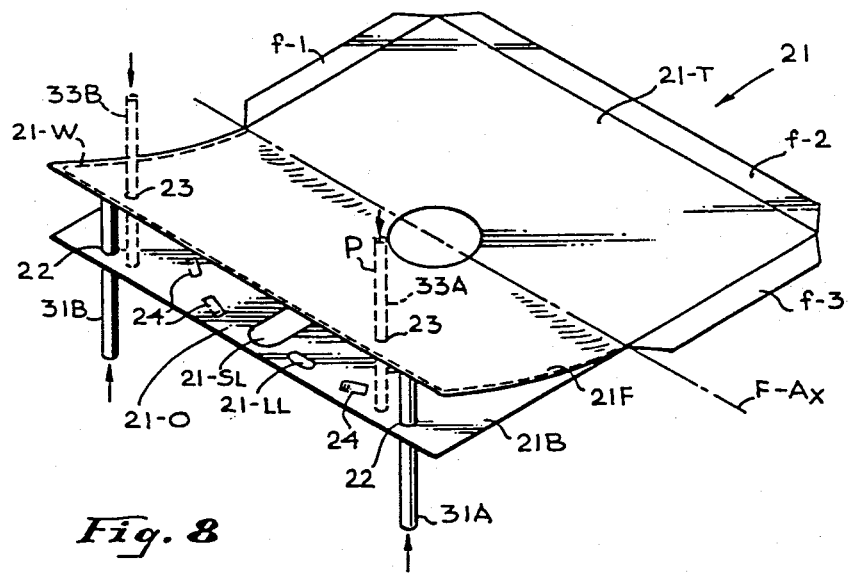
FIG. 8 shows this jacket in inverted perspective view and disposed in illustrative operative relation with schematically indicated opening means and partitioning means.

Associated jacket embodiment:

Novel disk pack embodiments like those above described will be understood by workers to be particularly apt for advantageous use in the form of a cartridge, i.e., the combination of a disk pack in conjunction with a protective jacket or envelope structure in which the disk pack remains during partitioning and transducing operations. Such a jacket 21 is indicated, for instance, in FIGS. 7 and 8, being designed somewhat along the lines of a prior art, single-disk jacket 3' (FIG. 2), but modified for the purposes of the present invention as illustrated in FIGS. 7 and 8. Jacket 21 is shown in plan "bottom" view in FIG. 7; and is shown, in "top" perspective view, in FIG. 8 as cooperated with jacket-opening means, schematically shown in conjunction therewith and functioning as described below. Such a modified jacket will be preceived as especially suited for housing a rotable pack of flexible disks, like pack S in FIG. 5, being apt for accommodating the rotation thereof, in situ, as well as for the locator hole partitioning mode and associated transducer access described above (see details in U.S. Pat. No. 4,086,640).

Thus, referring to FIGS. 7 and 8, jacket 21 comprises a pair of opposed, relatively flexible panels, namely top panel 21-T and bottom panel 21-B, joined together, along a closed end as well as along about one-half of the two adjacent sides by means of flaps f-1, f-2 and f-3 shown extending in partly assembled fashion from top 21-T in FIG. 8, and shown folded-over and joined to the edges of top panel 21-T in FIG. 7. Panels 21-T, 21-B may be comprised of PVC (polyvinyl chloride of about 10 mils nominal thickness), or like material, known to workers in the art.

Figure 9:
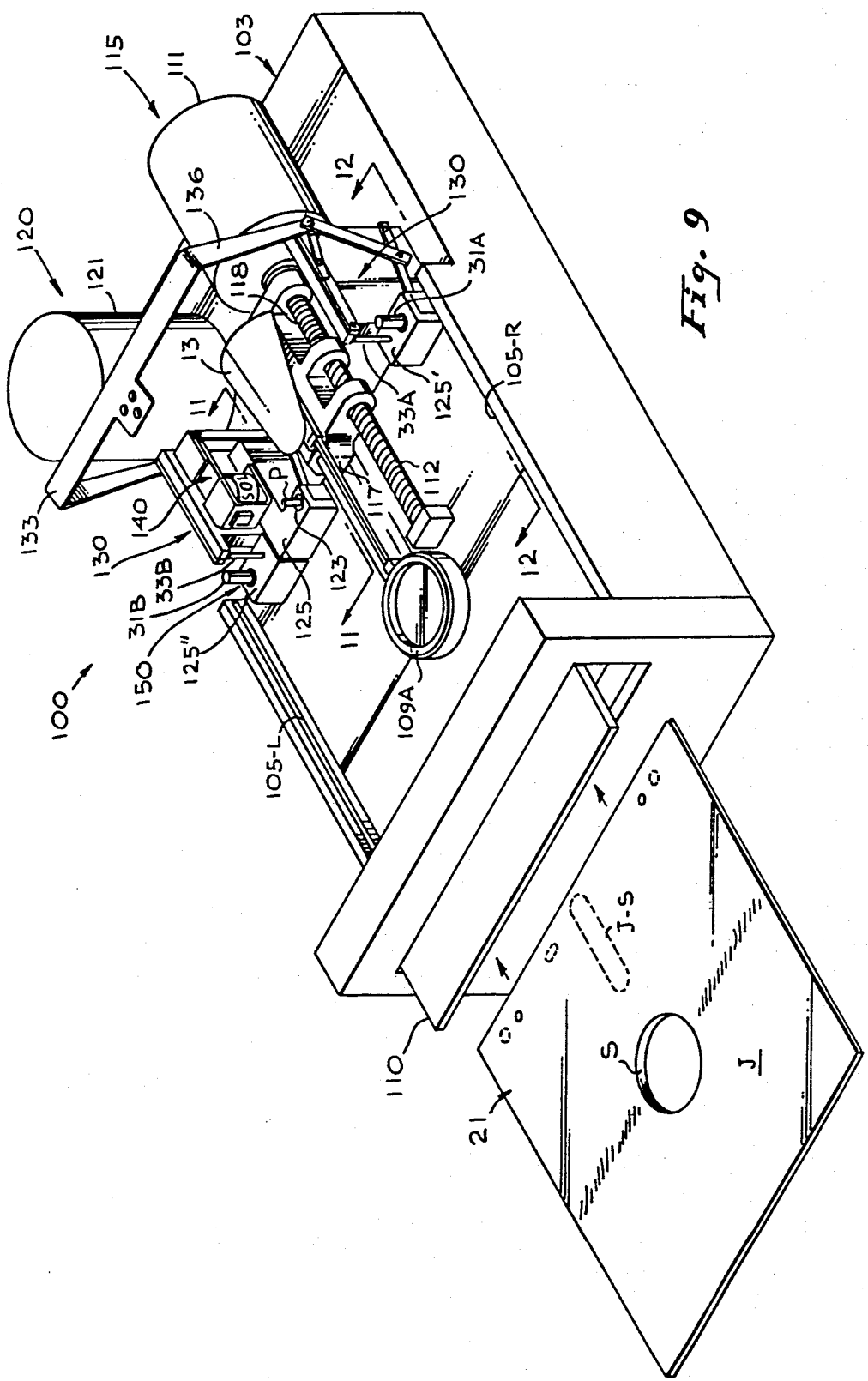

It will thus be understood that these top and bottom jacket panels 21-T and 21-B are preferably joined by folding over flaps f-1, f-2 and f-3 so as to permit their being spaced apart sufficiently to form an entry slot 21-O and to form a pocket for admitting and operating a flexible disk pack of prescribed diameter and thickness, such as shown in FIG. 5. Jacket 21 will have conventional apertures corresponding to the spindle hub and index hole (21-H, 21-I, respectively, but slightly enlarged therefrom), as well as having two pairs of "spreading-rod apertures" (up-spreader-apertures 22 through base panel 21-B, and "down-spreader apertures" 23 through top panel 21-T), to accommodate the upper and lower jacket spreading means, according to the invention (see in phantom FIG. 8). Illustrative pack S is shown outlined in phantom in FIG. 7. Spreading is preferably done automatically when the so-formed cartridge (jacket 21 containing disk pack S) is inserted into a disk drive (FIGS. 9 and 10), this being indicated schematically by the up-thrusting plungers 31 and the down-thrusting plungers 33 in FIG. 8, according to another feature. Down-plungers 33 are preferably also arranged to pin the jacket to a fixed portion of the chassis to hold it fixed with respect thereto when the pack is rotated therein. Preferably the "spreading action" of these plungers is automatically invoked by closing the entry door of the drive apparatus after admission of the pack-containing jacket (FIG. 9). It will thus be apparent that the two opposed (upper and lower) "spreader means" 31 and 33 act in concert to separate the outer edges of the "entry slot" 21-O when the disk pack is to be "accessed" by a transducer assembly (FIG. 6).

Retainer means such as tabs 24 are also preferably provided within jacket 21 to retain the disk pack, removably, in prescribed position therewithin. These retainer tabs 24 preferably comprise a suitable number of upper and lower inwardly-projecting members projecting normally inward from the top and/or botton panels adjacent entry-slot S-O and "following" the periphery of the pack as positioned within jacket 21. This is indicated schematically in FIGS. 7 and 8.

An "entry flap" 21-F is formed of the "outer half" of top panel 21-T, as schematically indicated in FIG. 8. Flap 21-F is adapted to be pivoted away from lower panel 21-B, along a prescribed flexing axis F-$A_X$ so as to provide an entry slot 21-O sufficient to accommodate the partitioning of the pack within the jacket as well as the related entry of the transducer assembly, as illustrated in FIG. 6. Preferably, this pivoting flap 21-F is held closed, to retain and protect the contained disk pack by suitable "spring return" means, either in the form of panel material which is suitably stiff and/or with a stiffening "return-wire" 21-W embedded along the periphery of the flap as indicated schematically in FIGS. 7 and 8. In extreme cases, return springs may be provided across slot 21-O.

Jacket 21 also has a slot 21-SL in base panel 21-B to accommodate engagement of the enclosed flexible disk pack (specifically the "bottom" disk thereof) with a transducer "contact pad" (CP) (see FIG. 6) when a Read/Write head is impressed upon (one or several disks in) the pack, opposingly, as known in the art. Similarly, bottom panel 21-B is also provided with an elliptical locator aperture 21-LL adapted for admitting a select-partitioning plunger of the type described above and illustrated in FIG. 5 and elsewhere.

Workers will appreciate that envelopes according to this feature will, at times, preferably be "flippable", i.e., allow one to operate the contained-pack from either side as above-mentioned. In such a case, as a further feature, it is preferred to modify the described jacket so that the up/down jacket-opening plungers may be interchanged upon "flipping". That is, as shown schematically in FIG. 21, the array of plungers 31 and associated envelope-ports is modified from "up/down-down/up" (looking across slit 21-O in FIGS. 8 and 21) to "up/down-up/down"—in effect switching the positions of plungers 33A and 31A and their associated envelope-ports 23/22 respectively. Likewise, an additional index port 21-I' is added.

Figure 21:
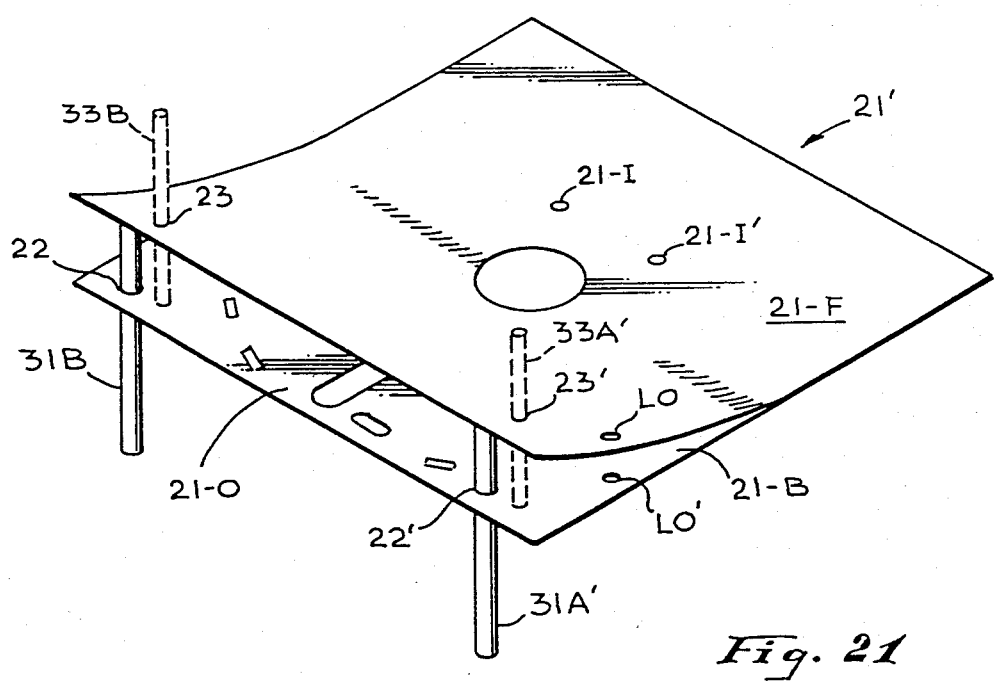
FIG. 21 is an upper perspective of a jacket in the fashion of FIG. 8, but modified somewhat.

Also, according to a related feature, the jacket is provided with a "flag" aperture such as registering holes LO, LO' through the panels of jacket 21' in FIG. 21. Such holes may be used to signal the presence of a "multi-disk" cartridge (as opposed to the conventional "single-disk" cartridge) and, being suitably sensed, invoke responsive action in the disk drive unit. Workers will readily appreciate the advantage of this "flag" feature (e.g., allowing one to use a common drive for single-disk and multi-disk cartridges, making automatic accommodations therefor) and how it may be implemented in various ways. For instance, a photo-detect assembly may be used to sense this "flag" hole only in single-disk cartridges, and responsively disable the jacket-opening and partition plunger assemblies.

Jacket 21 and the flexible disk pack contained therein thus comprise a novel flexible disk cartridge, with the pack so positioned and held therewithin as to be free to rotate, as well as to be selectively partitioned and accessed therein as previously described. Jacket 21 is preferably lined with a non-shedding, non-abrasive cleansing tissue on its inner faces as known in the art, to wipe clean and protect the outer surfaces of the disk pack contacted thereby.

Figure 10:
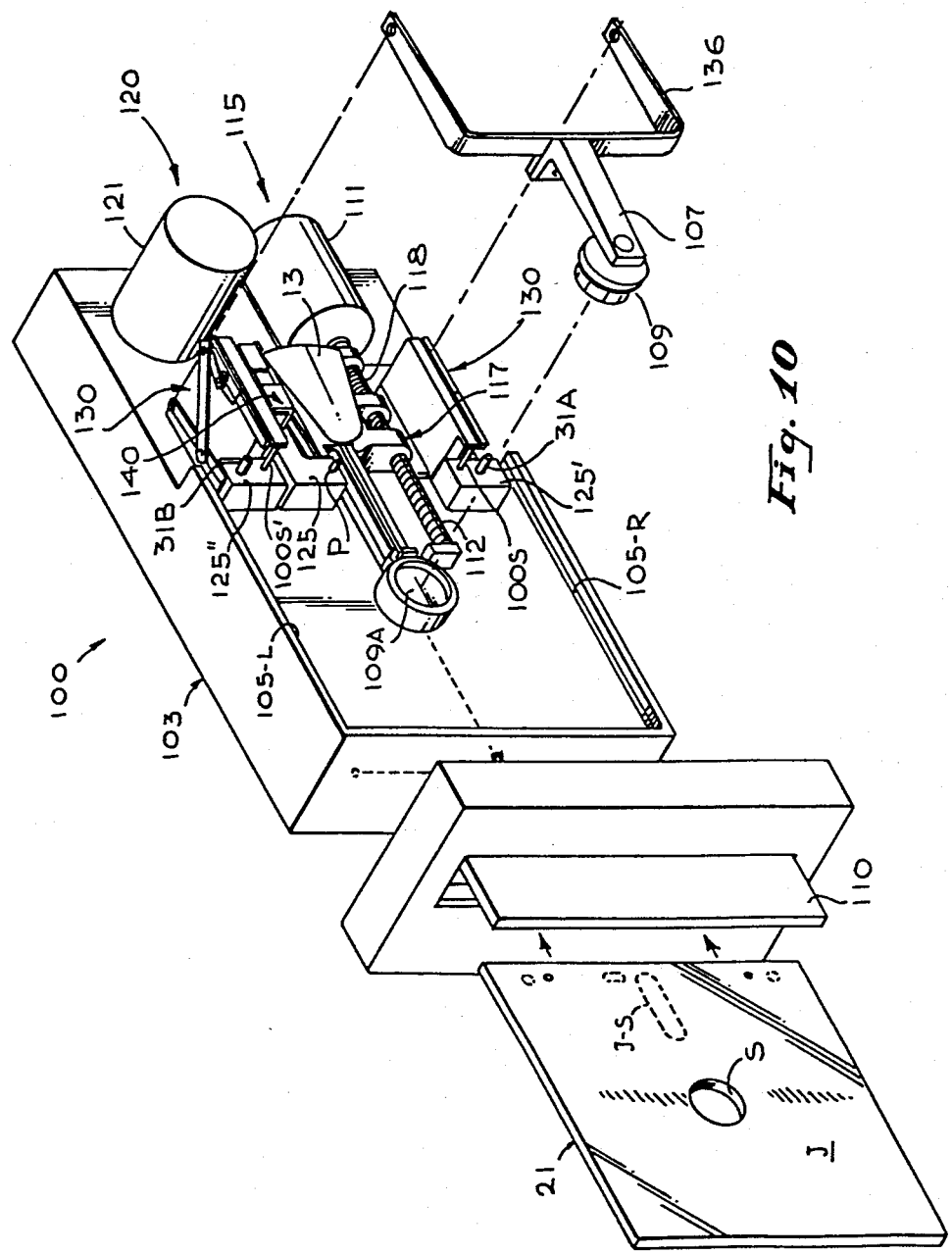
FIG. 10 is an enlarged close-up view of working elements of this drive, with certain superstructure broken-away for clarity of illustration.

Modified drive for flexible disk pack:

FIGS. 9 and 10 show a relatively conventional type of flexible disk drive 100 which has been modified to accommodate operation with novel cartridges (jacketed flexible disk packs) according to the invention. That is, drive unit 100 will be understood by workers in the art to comprise a compact, portable, disk drive device that interfaces with a central processor portion of a data processing system by way of a suitable control unit (not shown), as known in the art.

Figure 11:
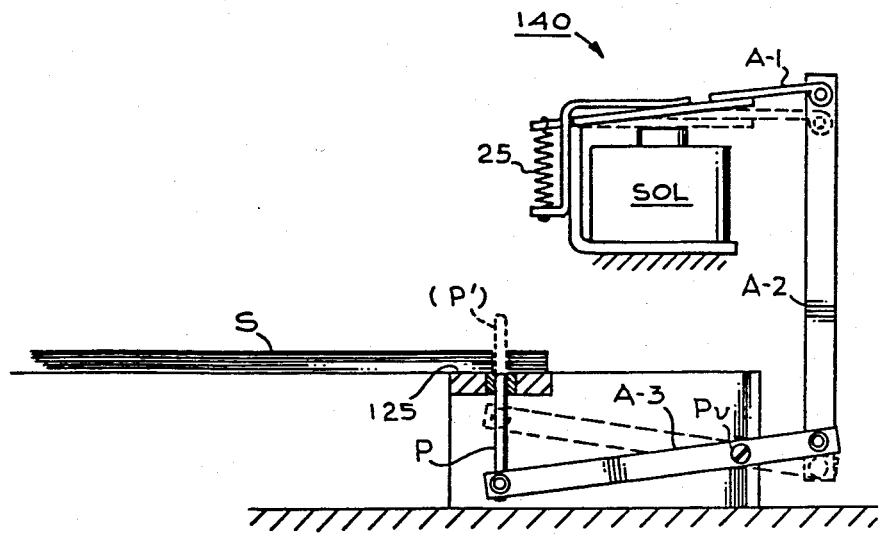
Figure 12:
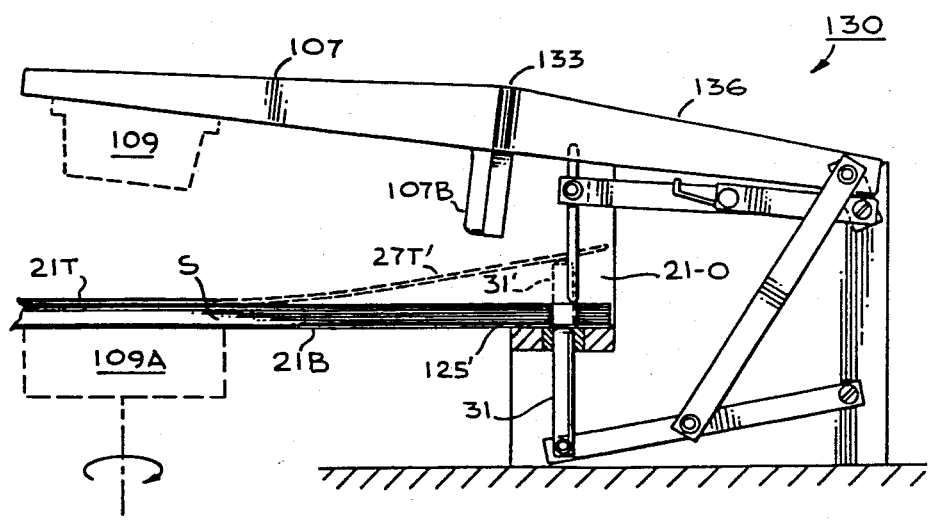
FIG. 12 is a similar view of an automatic jacket opening means likewise adapted for such a disk pack and suited for incorporation in such a drive.

Thus, such a modified disk drive as shown in FIGS. 9 and 11, while otherwise constructed and operating as known in the art, will be understood to include modifications required in order to make advantageous use of the novel disk pack and jacket of the present invention, such as, for example, jacket-opening spreading means (FIGS. 7, 8 and 12); pack rotation (vs. disk rotation) means (FIG. 6); pack partitioning means (FIGS. 3, 6 and 11) and an associated transducer assembly (FIG. 6). The pack-rotating spindle will be understood as being controlled to rotate the pack to any one of several angular orientations (one associated with the accessing of each disk in the pack) for partitioning, and is preferably operated with a motor adapted to be stepped by prescribed precise constant increments, representing digital control to step the pack by precise angular increments to any selected partition-orientation (see details in U.S. Pat. No. 4,086,640).

Partitioning is effected, preferably by a prescribed partition subassembly 140 including a select plunger (see plunger P in FIGS. 6 and 11) disposed to be thrust upward through an accommodating aperture 123 in working surface 125, upon actuation by an associated solenoid SOL. That is, as will be understood from FIG. 11, a "partition-signal" applied to energize the solenoid coil will act to pull a "clapper arm" A-1 down (against return spring 25) and throw an associated plunger-linkage (arms A-2, A-3 pivotably mounted at pivot pv on the chassis) downward and thereby thrust plunger P upward, as indicated in phantom in FIG. 11. This partition assembly will be recognized as particularly compatible with the subject "floppy pack" and with unit 100 to perform the select partitioning function on the jacket-encapsulated pack in the above indicated manner.

According to a related feature, spindle drive motor 121 is adapted to rotate the pack, disposed within the jacket J and engaged between hub 109 and drive spindle 109-A, for transducing, as known in the art, as well as to shift according to a related improvement feature, into a second rotary-step mode for partitioning-positioning. That is, responsive to a prescribed indexing (digital) control signal, motor 121 will digitally step the spindle and pack rotationally by a prescribed precise number of integral angular increments until the selected "partition orientation" (i.e., rotation) is achieved. Thus, in effect, the pack is made to step from "zero" (or "Start Radius", see index hole 1-Ih and axis $A_X$-1, FIG. 3) a prescribed number of "angular steps" to thereby "count" its way, digitally, to a prescribed locator hole position. Here, a plunger P may thrust the pack to partition it and expose the corresponding selected disk recording surface, as described above. For instance, in this embodiment it is convenient to step-rotate the pack 1.8° per digital "stepping pulse" using a dual mode motor, so that, with the 25 locator holes (embodiment of FIG. 3) separated at 18° intervals, each rotary increment of 10 steps will carry the pack 18°, i.e., from one locator hole to the next.

Thereupon, the transducer carriage means (see step translation motor 111) may be activated to initiate head-entry into the so-partitioned pack (from an outer reference position) while the partitioning plunger P is conjunctively withdrawn. Carriage-entry will thrust the transducer down upon the selected disk surface and will allow the distal end of the transducer mount, and particularly shroud 13 mounted thereon, to contact and assume support of the upwardly-thrust portion of the pack. Shroud 13 will maintain this contact, guidingly, while the pack is rotated and the Read/Write operations are performed.

That is, stepping motor 111 will translate the transducer head into the split pack and place it in compliant "gliding" contact with the selected recording surface of the disk for transducer operation (e.g., see U.S. Pat. No. 3,810,243 for typical operations). Upon completion of the transducing operations, at one or several tracks, the head may be withdrawn and a different recording surface (disk) accessed in another partitioning cycle. The indicated novel partitioning and head mount arrangements will be seen as establishing stable, protected transducer positioning at any selected disk surface of such a flexible pack.

According to this feature, the transducer is kept disk-engaged while moving from track to track on the selected recording surface, until it is entirely disengaged and withdrawn to the outer "rest position" (FIG. 6). During partitioning and transducer entry, the rotary drive will, of course, hold the pack in fixed position, being thereafter rotated (at 360 rpm) for transducer operation, with the "upper" deflected disks (above the selected one) being bent smoothly up over the mentioned shroud 13, as they pass over the transducer carriage 117.

Shroud 13 is configured, positioned and adapted, according to a related feature, to smoothly, frictionlessly guide and urge these "upper disks" (above the split) thus upward, while they are so rotated to permit the unimpeded, non-damaging entry and withdrawal of the transducer mount into, and out of, the split-pack (e.g., for Read/Write operations at different disk tracks).

Workers in the art will appreciate that with such a select/partitioning means, operable in conjunction with such a hole-encoded flexible disk pack, the pack may be split to expose any selected disk, conveniently, yet precisely—e.g., simply rotating the pack to a prescribed angular position corresponding with registry of the plunger with the associated partitioning pattern of locator-holes, then thrusting the plunger up these locator-holes sufficient to admit entry of the transducer-shroud. Thereupon the plungers are retracted and rotation of the pack may be resumed.

Thus, for instance, when the "nth" disk in a pack is selected, the pack will be rotated to "START" position (index hole reference), then stepped by ($n \times 18°$), the angular increments corresponding with a rotation of the pack so that the associated locator-sites register with the plunger-locus. Up-thrust of the plunger will then lift all disks "above n" away from the upper surface of "n" disk, exposing the latter for transducer entry as described. For instance, as workers know, such a stepping motor/lead screw arrangement can position the transducer head on any one of about 77 discrete track positions of a disk surface. Unexpectedly the "paper thin" disks can interfit slidingly while rotating, yet appear to experience minimal frictional wear and damage at the contacting surfaces, especially when protected by the mentioned flexible inter-liner means.

Workers will recognize that other related partitioning means may be employed within the spirit of the subject feature. For instance, a "double" partition may alternatively be invoked, with the floppy pack directed away from the selected disk on both sides thereof (rather than just one side—e.g., to be able to access this disk with two opposed transducer mounts and so facilitate a two-surface transducer capability, while eliminating problems associated with varying head/contact pad pressure due to varying numbers of intervening disks). As accommodating pattern of partition holes and transducer mounts would, of course, be provided in such a case (e.g., the mounts would bias the selected disk opposingly against one another). Also, two pairs of opposed plungers would preferably be provided, one on each side of the entry-path from the transducer mount, these apt for locating the selected disk (sector) between entering transducers—these being provided in a form (not shown) evident to workers.

Figure 24:
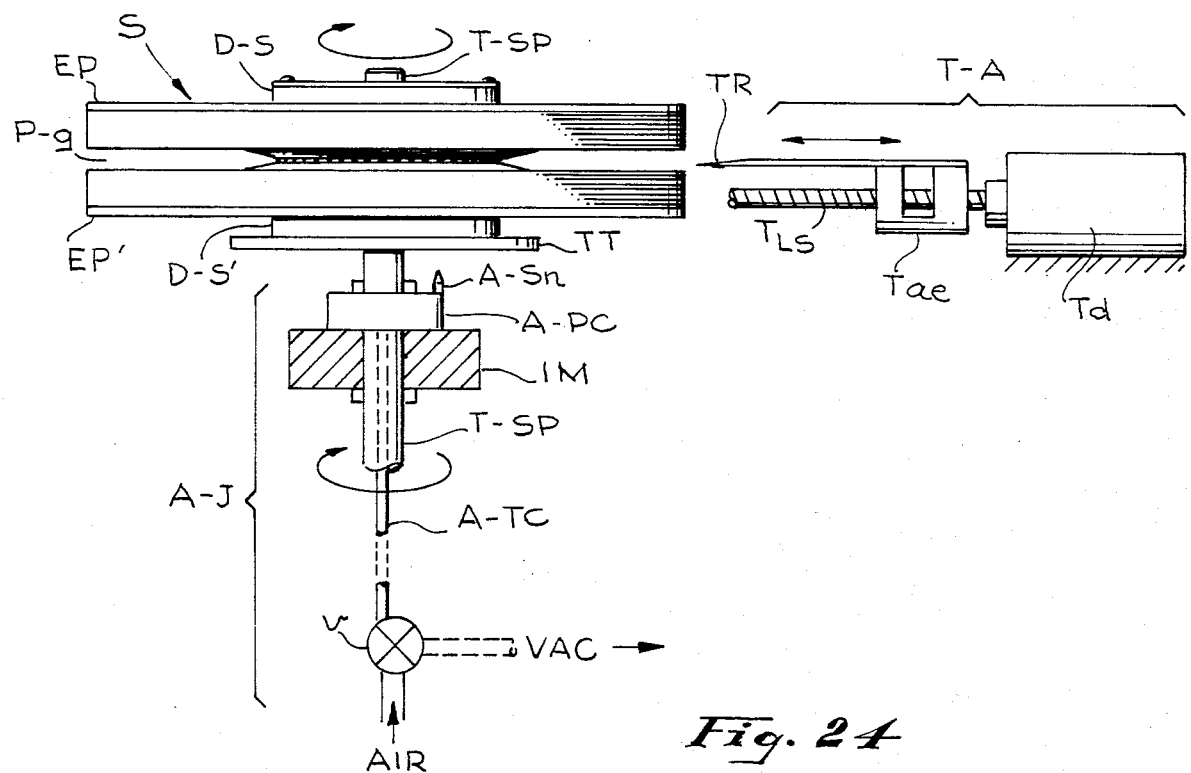

Pneumatic, hub-originated partitioning; FIG. 24:

FIG. 24 schematically suggests another embodiment adapted for pneumatic "end-wise" partitioning (e.g., versus the above discussed mechanical mode). Preferably, as detailed below, partitioning is effected from within the stack's hub or adjacent thereto.

Figure 25:
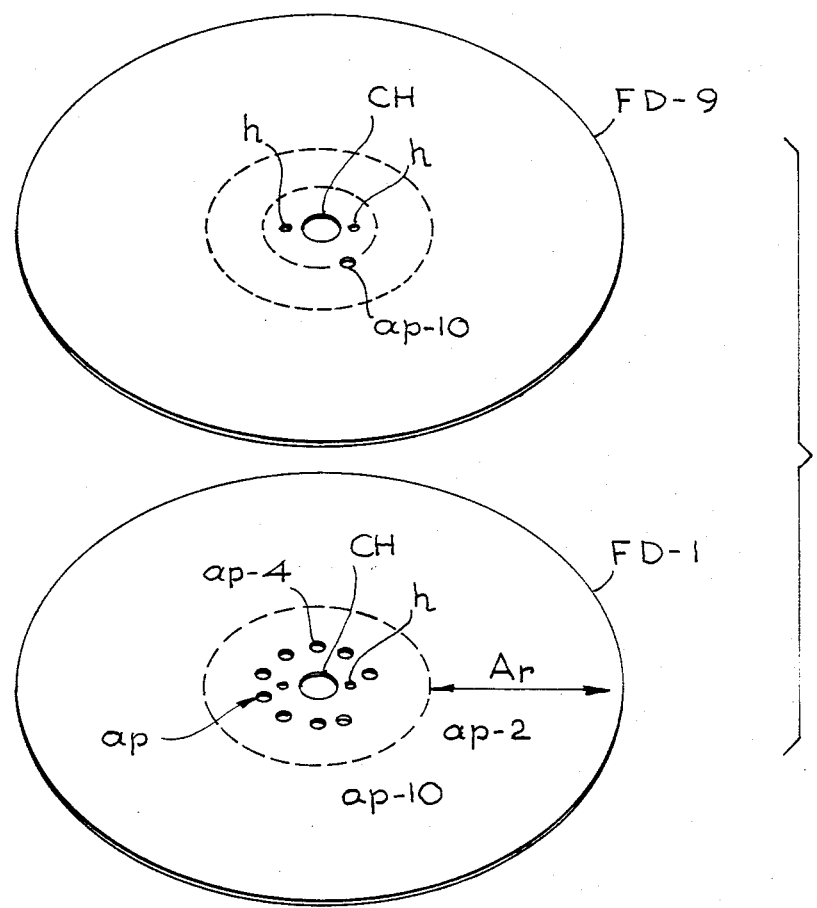
FIG. 25 shows a flexible disk modified therefor.
Figure 26:
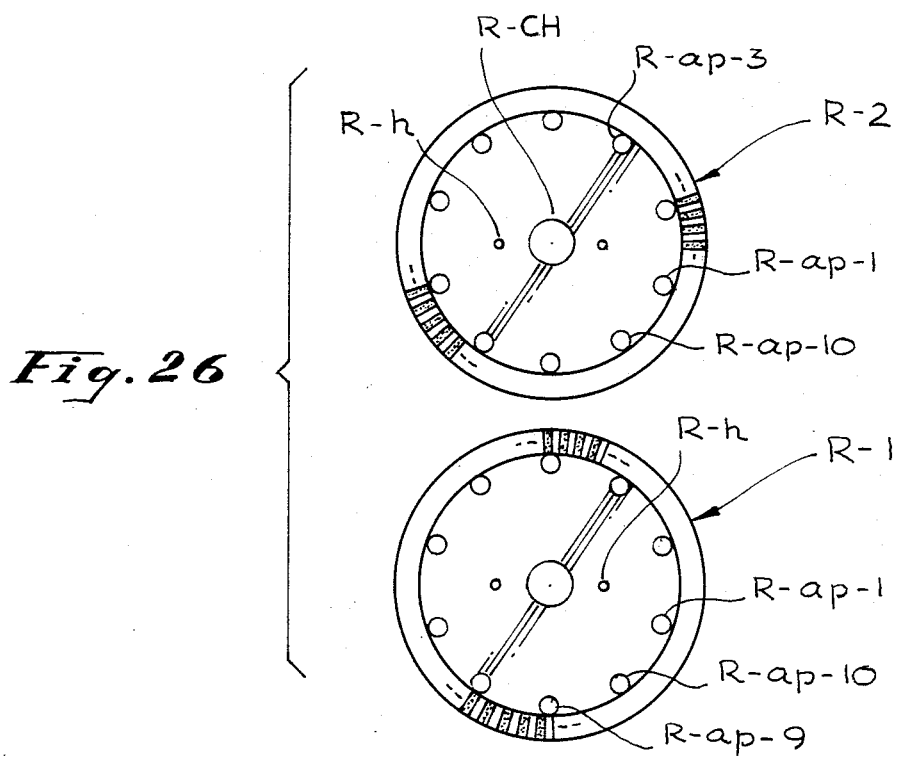
FIG. 26 shows an inter-disk spacer.

Thus, FIG. 24 is a schematic, rather generalized functional showing of a flexible disk pack S mounted on a conventional turntable TT (for relatively high speed rotation) and comprising a stack of flexible disks FD with intermediate washers R, held together between a pair of collars D-S, D-S' (see also FIGS. 25,26). Understood will be the partition means adapted to pneumatically partition the pack for access entry of a conventional transducer mount TR, adapted for high speed non-contact transduction as generally understood in the art. Here, and elsewhere, the materials, mechanisms and systems alluded to should be understood as conventionally constructed and operated as presently known in the art, except where otherwise mentioned.

In this embodiment a stack of high speed rotated floppy disks will be understood as pneumatically partitioned, "on-the-fly" (without interrupting pack rotation) and "from within" (i.e., adjacent the hub region)—e.g., as opposed to other embodiments involving just a few low speed rotated floppy disks bound in a portable cartridge and adapted to be end-wise partitioned by mechanical means and only when pack rotation is terminated. Workers will appreciate the enormous advantage accruing from non-mechanical internal pneumatic partition means, effecting partitioning "on-the-fly" and without termination of pack rotation—especially as implemented in the below-described "partitioned apertured washer" mode.

Thus, fixed floppy pack AS will be understood as mounted for rotation upon a spindle T-SP and associated turntable TT, pack S comprising a plurality (e.g., here 10) of flexible magnetic recording disks FD separated by washers R which are "partition-apertured" according to this feature of invention (as detailed below and indicated particularly in FIGS. 25 and 26). For illustration purposes, a transducer array T-A is indicated and understood as adapted for selective translation (as indicated by arrow) into, and out of, partition gap p-g between the disks in pack S so as to present a prescribed transducer core array TR in non-contact, transducing relation with a prescribed (upper) disk surface. Pack S is here shown as pneumatically hub-partitioned between disks FD-4, FD-5 by way of example.

According to a related feature the partitioning air supplied to the hub region by a partition jet assembly A-J is adapted to present a high speed jet of partitioning air end-wise of pack S and entrained up a prescribed one of the bores generated in the array of partitioning-apertured washers and disks, this being controlled according to the rotational position, or indexing, or a delivery jet nozzle A-SN relative to pack S.

Flexible disk pack S will also be understood to be conventionally engaged by a pack rotation assembly for prescribed high speed rotation (the "high performance" systems like those described will be understood to involve disk rotation on the order of at least several thousand rpm). This rotation assembly comprises conventional means, schematically indicated as including a turntable TT and spindle T-SP and an associated drive (e.g., including a motor, belt coupling and associated pulleys and gears, etc., as well understood in the art).

Once pack S is so engaged and so rotated, it is ready for transducer operations on a selected disk, access to which (e.g., by transducer assembly TR, as shown in the art) is best facilitated by a (full or partial) "partitioning", sufficient to expose the selected disk surface to accommodate entry of the transducer mount. Here, it should be appreciated that flexible disk packs like those described are particularly apt for "pneumatic" partitioning from a central, or hub-originated, partitioning means operating as a partitioning jet as detailed below.

Transducer TR may be of conventional design and is part of a transducer assembly T-A adapted to reciprocate TR (as indicated by the arrow) radially into, and out of, the partition-gap in pack S. The transducer and actuating means may be provided as well known in the art and need not be detailed here. Thus, the transducer mount may be translated axially (e.g., "slaved" to "follow" the hub partition means) to seek registry with the plane of a "selected" disk, as is conventional. Transducer/disk loading will preferably be very light (a few grams), and not sufficient to seriously interfere with the separating air-stream between adjacent disks.

By way of example only, an actuation drive motor $T_d$ is indicated as coupled to rotate a lead screw $T_{LS}$ on which the head mounting arm is mounted, being threadably en engaged thereto via bracket $T_{ae}$ (see details in U.S. Pat. No. 4,086,640) for precise translation into the pack (e.g., to access specific tracks on a selected disk surface, as is well known in the art and need not be detailed here). As described below, workers will recognize that the heads may be fixed or be suspended upon compliant means adapted to advantageously interact with the air-separated flexible disks according to the invention.

Disk pack (FIG. 24):

Flexible disk pack embodiment S will be recognized as novel, being provided—according to a feature hereof—with one, or a few dozen floppy disks with associated intermediate spacers R (described below); the disks and spacers being partition apertured to render pack S "end-wise partitionable", pneumatically. Pack S is preferably a removable cartridge type (as known in the art) and may include a surrounding jacket or protective envelope (or shroud), with suitable ports for air exchange.

Thus, coaxial stack S comprises a relatively few commonly-supported, flexible disk records FD, understood as mounted and retained, along with intermediate spacers R (see FIGS. 25, 26 also) between a pair of opposed flexible end-plates EP, EP', being clamped between collars D-S, D-S' according to one feature hereof. Disks FD are spaced apart a prescribed uniform distance by identical annular radially-vented separator rings R as known in the art.

Rings R and disks FD are "partition apertured" according to this feature (as are turntable TT, collar D-S' and end plate EP') also being clamped firmly between end plates EP, EP', by opposed collars D-S, D-S'. The disks and spacers are also pierced (holes h FIGS. 25, 26) to receive coupling means as known in the art (e.g., bolts or rivets to be threaded through holes h in the collars, disks, plates and spacers; or like fastener means used to retain pack S as understood by workers in the art—e.g., preferably including locator-rods as well, though none are illustrated). The inner circumference of the disks, of the spacers and of the collars, as so stacked and clamped together, are to be relatively congruent, defining the sides of a cylindrical center hole of prescribed diameter and height and adapted to be received on spindle T-SP as known in the art—being rotated on the turntable TT conventionally.

Figure 27:
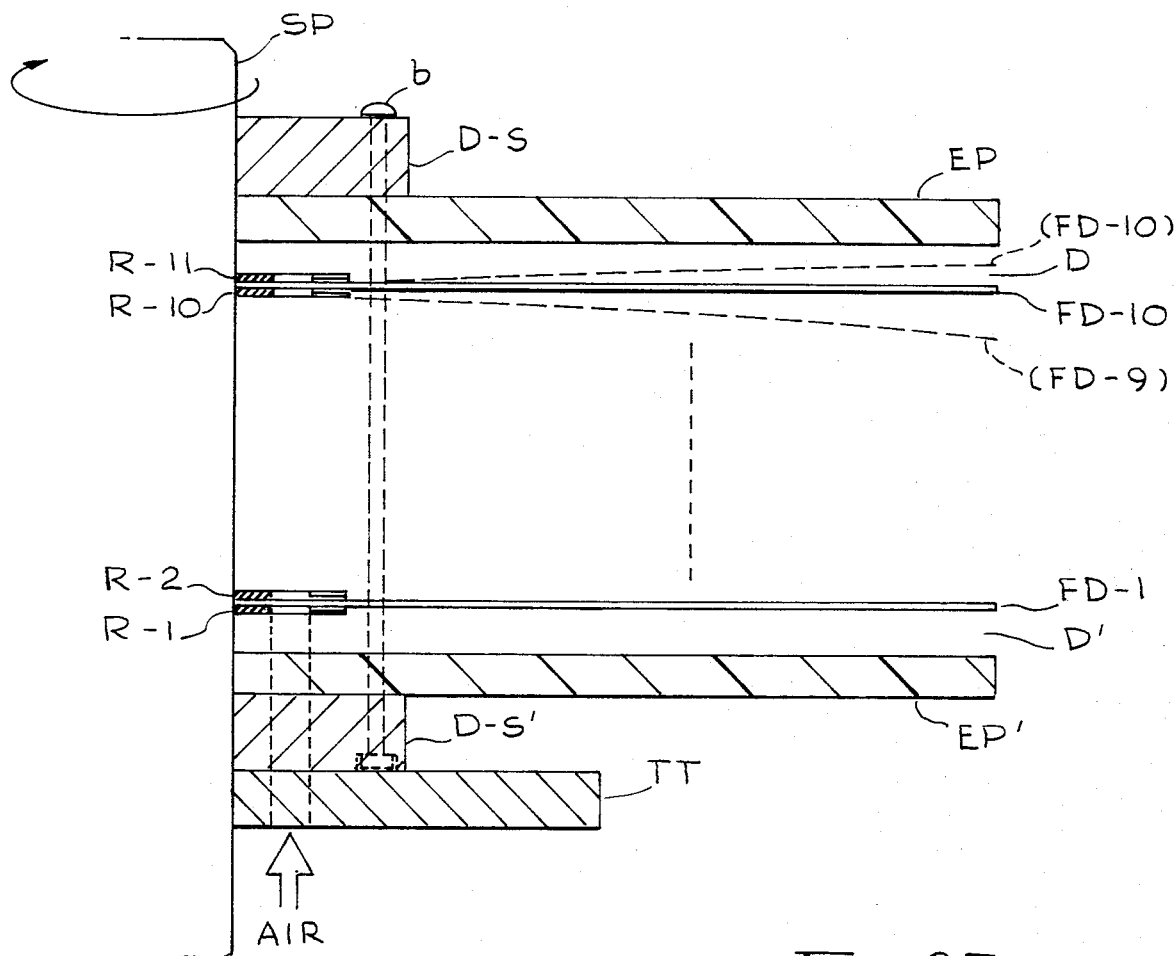
FIG. 27 is an enlarged partial side section of pack as in FIG. 24 schematically indicating apertured spacers, turntable, etc.

Disks FD; FIGS. 25, 27;

Flexible disks FD are of a type known in the art and, as workers will appreciate, may assume various dimensions and compatible constructions. For instance, a well-known polyethelene terephthalate a few mils thick (1.5 mils preferred here) with a randomly-oriented ferric oxide coating on at least one side; disk diameter being approximately 12 inches, with a "standard" center-hole diameter about 2.5 inches. The spacers R may comprise like material and dimensions.

Thus, representative disk D, indicated in FIG. 25 will be understood as like the above-described floppy disks, except as otherwise mentioned here; but however are particularly characterized by an array of partition apertures (see the nine partition apertures ap in FD-1 concentrically disposed about center hole CH), which are disposed adjacent the disk's inner diameter, or hub, rather than its outer diameter. Holes ap will, of course, be understood as adapted to accommodate the "interior pneumatic partitioning" mentioned elsewhere.

Thus, partition holes ap on all disks will be understood as disposed along a common circumferential axis, closely adjacent center hole CH and within the "recording annulus" defined by a radial segment $A_R$. "Coupling holes' h are provided, as mentioned, to accommodate coupling bolts, or like fasteners, connecting the clamping collars.

According to the preferred construction here indicated, the pattern of partition apertures is arranged and cut-out to be unique for each disk so that all annular spacers (aperture pattern) may be alike. However, for manufacturing and assembly convenience, workers may use other modes. Thus, here—as before—there is a prescribed number of partition gaps possible and an associated number of aperture sites—the latter being the same for all disks and in registry when the pack is assembled.

Here, nine (9) gaps p-g are possible, so there are nine (9) aperture sites. All sites are cut-out in the "bottom disk" (closest to air jet—here disk FD-1; see also FIG. 27 an enlarged half-section through pack S, etc., in FIG. 24), while none are cut-out for the "top disk" (farthest from air jet—here, FD-10); with the number cut-out increasing between these two (e.g., eight cut-out on FD-2, seven on FD-3, etc., through one cut-out on FD-9, as seen in FIG. 25 and none on FD-10).

Of course, as mentioned below, the disks are stacked together with the intermediate similarly-apertured spacers so that these nine ap sites register along the stack of disks to form nine "partition bores" as in the preceeding embodiments; each bore being a different length and thus terminating at a different disk.

End plates; dummy packs (FIG. 27):

Flexible disks FD will be understood as operating between a pair of flexible stabilizer end plates EP, EP-'—according to a related feature. These plates are adapted to have a prescribed compliance (e.g., to accommodate a "self-flattening" action of the plates under the centrifugal forces generated at the operating rpm). Such a flexible end plate is quite novel and rather surprising—end plates are conventionally rigid. It is an advantageous feature and is very simple to provide; for instance, preferably comprising a plurality of contiguous flexible recording disks 55 (identical to the record disks, except that no magnetic coating is needed). Plates EP, EP' fix the pack position axially and remain quite flat, being held by centrifugal forces. For instance, in one embodiment, with a pack comprising from 10-20 polyester disks 1.5 mil thick separated by 10 mil spacers, adequate end plates are formed with startling simplicity—simply by pressing about a hundred uncoated floppies together—these being held together contiguously (e.g., simply by static friction) in a laminar array. Ordinarily, the indicated clamping—pressing metal spacers against flexible disk material—will be adequate to hold the relative position of disks and spacers between end plates.

Of course, it will be understood that, preferably and in most cases, "dummy" disks and associated intermediate spacers (i.e., a "dummy pack") will also be provided at the top and bottom of the record stack (here, adjacent FD-1 and FD-10 respectively) to accommodate a projected full partitioning deflection of record disks—especially the outboard disks FD-1, FD-10. In this case the partition gap p-g is projected at about 150 mils; accordingly, a "dummy pack" D, D' (FIG. 27) will be provided, top and bottom, each sufficient to accommodate a 75 mil deflection (as compressed by the deflection forces, with essentially no gap between dummy disks).

Spacers; FIG. 26;

According to another feature, recording disks FD are separated by annular spacer rings R. One being functionally indicated in FIG. 26. Spacers R will be understood as identical, serving to maintain disks axially spaced a prescribed uniform separation distance (here, about 10 to 20 mils preferably). The spacers may be vented radially (see peripheral hatching FIG. 26) to allow recording disks to be normally separated and lubricated by a thin film of air, as well as serving, during special partition times, to pass the partitioning air jet.

That is, according to another feature, spacers R, are partition apertured as were disks FD, to accommodate the recited interior pneumatic partitioning. In the preferred mode shown (FIG. 26), each spacer will have ten (10) partition apertures R-ap distributed about a prescribed circumferential segment being dimensioned and stacked to register (nine holes R-ap) with the apertures ap of disks FD [i.e., ap-2 to ap-10 with R-ap-2 to R-ap-10, respectively]. Likewise, a pair of coupling hubs R-H are provided to register with similar hubs h of disks FD to accommodate the coupling bolt, etc., between the collars.

Annular spacers R are apertured and stacked to register with these nine ap sites on the disks (see R-ap-2 through R-ap-10)—having one additional aperture (R-ap-1) for deflecting disk FD-1. Thus, it will be seen that directing the jet up through spacer hole R-ap-1 will deflect FD-1, while directing it through (registered holes) R-ap-2 will deflect FD-2, etc., through R-ap-10 (e.g., in FD-9; FIG. 25) to deflect FD-10 and so on.

Accordingly, the axially directed partition jet emitted from nozzle A-SN (see FIG. 24) will be understood as controlling "partition-select" by rotating it relative to pack S to register with any one of these ten spacer holes (and the intermediate holes through turntable TT, lower collar D-S' and lower end plate EP', as well as any intermediate "dummy disks" D'—see FIG. 27)—these holes similarly register with the ten spacer hole R-ap. In effect, this forms ten "bores", down through the pack from the dummy disks D (recording disks FD being omitted) down to the jet nozzle. (These details are not specifically illustrated but well understood and offering no problem in the art—not illustrated for simplicity and clarity of illustration).

Of course, as in the cases above, the partition bores may be differently generated; for instance, using a different hole pattern for each spacer and associated like disk holes to generate the "blind" partition bores; or by forming a common partition pattern and rotationally misregistering the stacked array (as before) etc.

More particularly, and with reference to FIG. 27, spacers R will be understood as arrayed in a stack with flexible disks FD therebetween, as indicated (see spacers R-1 through R-11, disks FD-1 through FD-10). That is, for example, an array of partition apertures, R-ap is formed about a prescribed inner circumferential locus about spacer-washer R-1, having center hole R-CH adapted to fit the turntable spindle and an outer diameter sufficient to perform the conventional spacing and mounting functions as well as the added novel function of delivering partition air to a prescribed interdisk gap. Apertures R-ap may be distributed in any number or spacing (preferably uniformally) about the annulus. Preferably, the companion washers R-2 through R-11 are so partition-apertured in the identical, registering manner. A like array of spacers are provided between the "dummy disks" but only the bottom ones (D') need be partition-apertured.

Partition jet (FIG. 24):

A pressurized air supply (source not shown but well understood in the art) is adapted to be delivered through a conduit, a valve v and hollow center tube A-TC, as known in the art. In this way pressurized air (gas) is delivered to a prescribed sump chamber A-PC, including an associated delivery nozzle A-SN, both understood as co-rotated with pack AS and sealed to fixed central tube via air-tight couplings as known in the art. The nozzle A-SN may be indexed selectively to different circumferential positions about the pack by rotary actuator (phase adjust means) IM, as known in the art. (Rotating chamber A-PC being thus in pneumatic communication with fixed hollow tube A-TC, mounted centrally within hollow spindle T-SP). While delivery of the air is preferably effected up through hollow tube A-TC, either configurations will occur to those skilled in the art. In particular, (and referring to the embodiments of FIGS. 24 and 25), it may be assumed that the partition between disks AD-1, AD-2 is effected by positioning the jet delivery jozzle rotationally with respective to pack AS so as to register with a selected bore (through TT, EP', dummy and record disks as well as intermediate spacers). This jet stream is directed upward through all the intervening spacers and disks to exit, readily, through the washer opposite the "selected" partition gap.

The foregoing (FIGS. 24-27) assumes that the disks are partition-apertured as above, with the partition air jet supply being directed end-wise from the bottom of the stack—a reversed mode would apply where the air supply is to be delivered from the top.

Workers in the art will visualize other ways in which the spacer means may be partition-apertured for so distributing partition air selectively and for providing jet air supply means adapted to deliver this air, simply according to its circumferential indexing relative to the pack and registry with the bores formed by proper stack. If a "double-nozzle" were used, the spacer apertures would be doubled, of course.

Operation:

An illustrative partitioning sequence will now be recited for clarification purposes—referring to the embodiments in FIGS. 24-27:

Preliminary assumptions:

It will be assumed that pack S is engaged atop the turntable and rotated thereby at operational speed, flattening-out disks FD, and D, D' as well as "end-plates" EP, EP'. This will, in turn, co-rotate chamber A-PC, with nozzle A-SN thereon assumed registered at a prescribed "START site" (here, registered with holes R-ap-1 on spacers R and registered holes through TT, EP', D' "as though" to deflect disk FD-1 upward). Air pressure is assumed "OFF" (valve v closed thereto). Also transducer mount T-A will be assumed retracted and out of engagement with pack S (as shown in FIG. 24).

With these assumptions, the partitioning-transducing operations would proceed generally as follows:

STEP 1

"Rest" condition; record separation and self-flattening

Once the pack and hub are rotating, ambient air will have been pumped out from between the record disks by centrifugal force, thus creating an underpressure there, as a source of suction. This suction will pull a minor air-throughput radially from about the center-hole via perforate spacer R—this serving to draw ambient air into the spindle center bore, driving air out between disks FD—keeping them "self-flattened" and "self-aligned" by the high speed rotation.

STEP 2

"Psuedo-partition" of FD-1 vs. dummy pack D'

Now, since this "rest" or static condition registers jet nozzle A-SN with the R-ap-1 holes, it can establish a partition jet stream issuing-out from spacer R-1 below FD-1 (once valve v is open); being blocked from further upward penetration by FD-1 which is not registeringly apertured (no ap-1 present; see FIG. 27 too), to open a partition gap between disks FD-1 and dummy pack D'. FD-1 thereupon assuming the approximate position of FD-9 in phantom FIG. 27. No transducing being called for, head TR will not enter this gap.

STEP 3

Nozzle shift; partition at R-10

Nozzle AS-N is next shifted rotationally relative to pack S, enough to register it with the holes R-ap-10—through R-1, R-2, etc.—and effect a new "selected" partition between FD-10 and FD-9.

More particularly, a memory stage in an associated disk drive control unit, storing the address (location) of all disk surfaces, is accessed for the address of (the top of) disk FD-9 as a "selected" surface. This generates a "partition-control" pulse which is applied to control the rotation of partition nozzle A-SN, to register it with holes R-ap-10, etc., through so the jet stream will exit through all spacers, terminating at R-10 (blocked by FD-10) to issue radially through spacer R-10.

This will deflect disks FD-10, FD-9, opening a partition gap therebetween (as shown in phantom, FIG. 27). FIG. 27 also suggests how "dummy pack" D is compressed by this, sufficient to accommodate the desired deflection of FD-10 (here about 0.075").

The pneumatic force of this air stream will be made sufficient (see valve control) to thrust the disks apart; enough to admit entry of the distal end of the transducer mount; whereupon it may further deflect them mechanically as required (e.g., for a wider gap p-g).

According to a related feature, it is found that a high-pressure burst (pulse) of air is ordinarily sufficient to open the partition gap (vs. continual air pressure)— and that the gap will thereafter remain open, evidently maintaining this (bistable) condition via a "self-pumping (centrifugal) action once the jet pulse ceases.

STEP 4

Transducer entry, loading

With a (partial) partition thus effected pneumatically, the transducer TR ("nose" thereof) may now enter between disks FD-10, FD-9 to complete the partition, effecting a further, upward thrust of the engaged ("upper") pack, (here FD-10 and D).

Transducer mount TR will continue radially inward to engage the upperside of selected disk FD-9, with the recording transducer being translated-in just enough to register with a selected track. Thewhile, pack S keeps rotating and the mount's end (nose) is further deflecting disks FD-9, FD-10, and disks behind them, away from the transducer. It will be appreciated that such deflection really "completes" partitioning; thus, the pneumatic partition forces need only create an opening around the path of transducer TR sufficient for it to make an unobstructed "partial-entry".

In actual practice, the transducer head will preferably be lightly "loaded" (e.g., about 1 gram load) by the selected record surface. This is preferably done—according to another feature—by a reduced, or slightly negative air stream (see valve control) from nozzle A-SN, kept continually on, through gap p-g.

This has been seen to—surprisingly—effect a slight compression of the gap, drawing the flanking disks (here, FD-9, FD-10) together, enough to "load" a flanking disk (here FD-9) against the transducer lightly and allow the disk to "fly" over it. It is theorized that this slight gap-compression is a "quasi-venturi" effect.

This compression (loading) will be sustained only as long as the pumping is maintained (see valve to vacuum pump FIG. 24)— and once the pumping stops, the gap will return to fully-open condition, (unloading disk FD-9 from the head therein)—a surprising and advantageously simple "head-height control" feature!

Workers will also note here, a novel advantageous mode of (non-contact) transducing with flexible disks i.e., bringing the disk to the head (not "vice versa", as is conventional) and "flying the disk over the head". Workers should also note the tremendous advantages accruing. For instance, one need no longer design a head to be properly flexible and loaded lightly-enough against the (floppy) disk—considerations that have vexed and limited head design greatly till now. Instead, with a proper (aerodynamic) head face configuration, the head may be kept fixed, while the resilient disk is made to fly past, the intervening air-layer (bearing) providing proper separation and resilience.

STEP 5

Transducer unloading, withdrawal

With transducing (R/W) completed (e.g., at all tracks on disk FD-9), the head may be unloaded. This is preferably effected simply by cutting-off the spacer pumping (see valve control v—vacuum shut-off), as mentioned above—whereupon the disks will diverge slightly, resuming the original partition gap.

It is noteworthy that even with the air-stream through the spacers terminated (e.g., air is cut-off at valve, or nozzle is shifted), the pack will still maintain the original partition gap until a new partition force is applied (the so-deflected disks thus exhibiting "bistable deflectability").

Workers will recognize that such an arrangement may also be adapted to enhance access speed i.e., reduce net time between partitioning and transducer-entry, allowing the nozzle(s) to shift to the next partition site while certain operations (e.g., transducer retraction) are carried-out. Transducer mount T-A is now retracted (step motor $T_d$ rotates lead-screw $T_{LS}$, etc.) and nozzle A-SN may be returned to "START" (facing R-ap-1) to complete the cycle.

The results achieveable with arrangements like the described embodiments will be gratifying to workers in the art; for instance, the desirable "end-wise", hub-oriented partitioning achieved with virtually no added parts except the rotatable nozzle; the associated pneumatic head load/unload control; the "disk-flown-overhead" concept, using a fixed transducer and the provision of partition-air delivery simply by aperturing spacers, or like annuli, communicating with a hollow spindle interior and jet nozzle.

Alternate embodiments:

While some described embodiments have involved a removeable cartridge (form of floppy disk pack), and some a fixed array, workers will understand that the instant invention may be used with any such disk arrangements, such as an array of floppies stacked fixed along a prescribed (horizontal or vertical) axis and susceptible of central pneumatic partitioning and isolation. Also, in some cases related rigid disks, or other configurations may be similarly manipulated.

Workers in the art will recognize many features of advantage and surprising novel utility deriving from device design and construction along the described lines. They will recognize that using such designs, pack cost may be minimized, especially where the partition-holes provided in the floppy disks themselves cooperate with apertured spacers and rotatable jet delivery means to derive the desired partition control—such an array being simple to manufacture and convenient to use.

Such a pack will be designed and adapted for advantageous interaction with central pneumatic delivery means of the type described, wherein the natural centrifugal pumping action of the pack under high speed rotation assists in establishing a stable air film-separation of disks, while also assisting in pneumatic partitioning.

It will be surprising to workers how stable, and bistable, the disk array will be (both "as quiescent" or static, and "as partitioned"). The versatile, fast, simple partition control it enables (e.g., with a simple fast nozzle-indexing) will be appreciated, especially since it facilitates a partition which is entirely pneumatic, with no engagement of mechanical elements needed (e.g., in the pack).

It will be particularly pleasant—while surprising—for workers to contemplate a pack of flexible disks that are adapted to engage a transducer array with a lighter, more uniform load despite the large member of disks in the pack; such an array accommodating pneumatic end-wise partitioning and head-loading, with relatively low head/disk engagement forces and a fixed head (e.g., non-contact R/W). Indeed, operation as described more closely approximates magnetic tape systems, with their associated long-lived head and media, than anything in comparable disk packs, and this is both surprising and gratifying. The flexible disk packs and associated manipulation means contemplated herein will be understood by workers in the art to have special utility for certain "high performance" (high rpm), out-of-contact recording applications.

It will be appreciated that novel flexible disk pack arrangements and techniques, as here described in the indicated, and other related recording systems, may be advantageously employed in various ways. such arrangements will be seen as especially advantageous in conjunction with and "end-wise, hub-originated pneumatic" partitioning arrangement as described.

It will be understood that the preferred embodiments described herein are only exemplary and that they are susceptible of many modifications and variations in construction, arrangement and use, without departing from the spirit of the invention. For example, it has been assumed that "central pneumatic means" are necessary for (at least partly) partitioning the pack—however, while this is preferable, facilitating quick partitioning and a simplified transducer mount, other related means may be employed. In certain instances, with the disks somewhat split by the "separating air stream", partitioning can be completed with supplementary means applied from outside the pack.

The above examples of possible variations of the present invention are merely illustrative. Accordingly, the present invention is to be considered as including all possible modifications and variations coming within the scope of the invention as defined by the appended claims.

What is claimed is:

1. In combination with a pack of flexible record disks, the pack being formed and arrayed in concentric stack to be co-rotated at a prescribed rotational velocity,
  a pair of "floppy-stack" end-plates, each such stack including a number of contiguous unseparated flexible disks, and being disposed at a respective end of the pack and adapted to assume the form of an integral relatively rigid, flat plate when co-rotated with the pack at the said velocity.

2. The combination as recited in claim 1, wherein the floppy stack is formed of contiguous flexible disks, the thickness and mass of this stack being determined according to the stiffness desired.

3. The combination as recited in claim 2, wherein the stack disks and record disks are relatively identical.

4. The combination as recited in claim 3, wherein each plate-stack is at least about 0.075 inches thick and the disks are rotated at several thousand rpm.

5. The combination as recited in claim 2, wherein the record disks are separated by respective spacer means.

6. The combination as recited in claim 1, wherein the combination further includes a pair of "dummy packs", each disposed between the end of the record-pack and the adjacent end-plate and comprising a concentric stack of disks with like intermediate spacer means and arranged to be co-rotated with the record pack and end-plates; the record disks also being all separated by respective separator means.

7. The combination as recited in claim 6, wherein each dummy-pack is sufficiently high along the rotation axis to accommodate extreme partition conditions without upsetting pneumatic stability of the record pack and preventing interference between the end record disk and the adjacent end-plate.

8. The combination as recited in claim 7, wherein the floppy stack is formed of contiguous flexible disks.

9. The combination as recited in claim 8, wherein the stack disks and record disks are relatively identical.

10. The combination as recited in claim 9, wherein the record pack is formed of about one dozen to three dozen disks, each on the order of about 1-2 mils thick.

11. The combination as recited in claim 10, wherein the dummy disks and record disks are comprised of relatively identical material and dimensions.

12. The combination as recited in claim 6, wherein the record disks include an encoded arrangement of partition apertures provided about at least part of a common arcuate segment, concentric with the disk center and extending through the disk or the adjacent spacer means or both.

13. A novel method of providing a pair of end-plates arrayed in combination with a pack of flexible record disks, the pack being formed and arrayed in concentric stack to be co-rotated at a prescribed rotational velocity, this method comprising:
  fabricating a pair of "floppy end-plates", each such plate formed by stacking a prescribed number of flexible disks to be contiguous, without separators; the number of disks being selected to induce a prescribed end-plate stiffness, as so co-rotated; and
  disposing each so-formed "plate" at a respective end of the pack whereby to assume the form of an integral relatively rigid, flat plate when co-rotated with the pack at the said velocity.

14. The method as recited in claim 13, wherein the thickness and mass of each floppy end-plate is determined according to the stiffness desired.

15. The method as recited in claim 13, wherein the floppy-plate disks and record disks are relatively identical.

* * * * *

UNITED STATES PATENT AND TRADEMARK OFFICE
CERTIFICATE OF CORRECTION

PATENT NO. : 4,514,778
DATED : April 30, 1985
INVENTOR(S) : Herbert U. Ragle and Dean DeMoss It is certified that error appears in the above-identified patent and that said Letters Patent is hereby corrected as shown below:

```
Col.  2, line 41, change "annd" to --and--.
Col.  8, line 61, change "sepration" to --separation--.
Col.  9, line 18, change "contam-" to --contem- --;
         line 29, change ""floopy" to --"floppy--.
Col. 11, line 29, change "0033" to --from--;
         line 67, change "anti-war" to --anti-wear--.
Col. 12, line 45, change "preceived" to --perceived--.
Col. 17, line 38, change "or", second occurrence, to --of--;
         line 52, change "shown" to --known--.
Col. 21, line 24, change "either" to --other--;
         line 28, change "jozzle" to --nozzle--;
         line 29, change "respective" to --respect--;
         line 33, change "readily," to --radially,--.
Col. 24, line 45, change "member" to --number--;
         line 61, change "such" to --Such--;
         line 63, change "and" to --an--.
```

Signed and Sealed this

Fifteenth Day of October 1985

[SEAL]

Attest:

Attesting Officer

DONALD J. QUIGG

Commissioner of Patents and Trademarks—Designate